United States Patent
Mimura et al.

(10) Patent No.: US 8,026,880 B2
(45) Date of Patent: Sep. 27, 2011

(54) OPTICAL ELEMENT, AND ILLUMINATING OPTICAL DEVICE, DISPLAY DEVICE AND ELECTRONIC DEVICE USING THE SAME

(75) Inventors: Koji Mimura, Kawasaki (JP); Ken Sumiyoshi, Kawasaki (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 1012 days.

(21) Appl. No.: 11/847,075

(22) Filed: Aug. 29, 2007

(65) Prior Publication Data

US 2008/0080040 A1    Apr. 3, 2008

(30) Foreign Application Priority Data

Sep. 29, 2006    (JP) ................... 2006-267978

(51) Int. Cl.
 *G09G 3/34* (2006.01)
(52) U.S. Cl. .................... 345/84; 345/204; 359/238
(58) Field of Classification Search .............. 345/84, 345/204, 697; 359/238, 239, 241, 242, 245, 359/248, 259
See application file for complete search history.

(56) References Cited

U.S. PATENT DOCUMENTS

| | | | |
|---|---|---|---|
| 5,784,507 A * | 7/1998 | Holm-Kennedy et al. | 385/31 |
| 7,315,667 B2 * | 1/2008 | Schmidt et al. | 385/12 |
| 2005/0002292 A1 * | 1/2005 | Komma et al. | 369/44.37 |
| 2005/0190376 A1 * | 9/2005 | Wegmann et al. | 356/509 |
| 2005/0200940 A1 * | 9/2005 | Emer | 359/299 |
| 2007/0001112 A1 * | 1/2007 | Shimoguchi et al. | 250/237 R |

FOREIGN PATENT DOCUMENTS

| | | |
|---|---|---|
| JP | 10-197844 A | 7/1998 |
| JP | 11-121974 A | 4/1999 |
| JP | 2001-34183 A | 2/2001 |
| JP | 2004-29673 A | 1/2004 |
| JP | 2004-333723 A | 11/2004 |
| JP | 2005-275262 A | 10/2005 |
| JP | 2006-140126 A | 6/2006 |

* cited by examiner

*Primary Examiner* — Kimnhung Nguyen
(74) *Attorney, Agent, or Firm* — Sughrue Mion, PLLC

(57) ABSTRACT

A microlouver includes a periodic structure in which a transparent layer and a light absorption layer are alternately disposed with a constant, repetitive period. The range of the exit direction of a light beam passing through the transparent layer is restricted by the light absorption layer. The periodic structure includes a periodic structure portion divided in the direction that intersects the direction in which the transparent layer and the light absorption layer are repeatedly disposed. In the periodic structure portion, between the periodic structures adjacent to each other, there is a difference of 180 degree in the phase of spatial frequency of each periodic structure.

25 Claims, 14 Drawing Sheets

Visible angle

203a 201a
201b 203
202
201
200

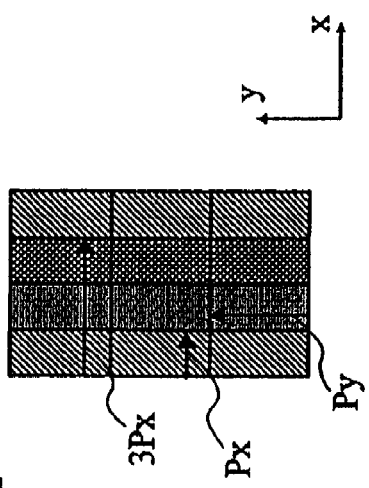
Fig. 8A Spatial arrangement of microlouver
Fig. 8C Spatial arrangement of display element
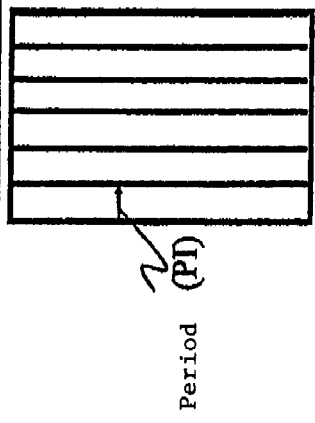
Fig. 8B Spatial frequency of microlouver
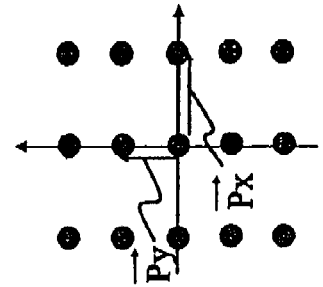
Fig. 8D Spatial frequency of display element
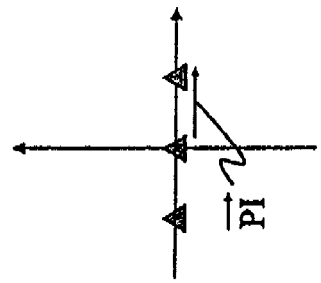
Fig. 8E Superposed spatial frequencies
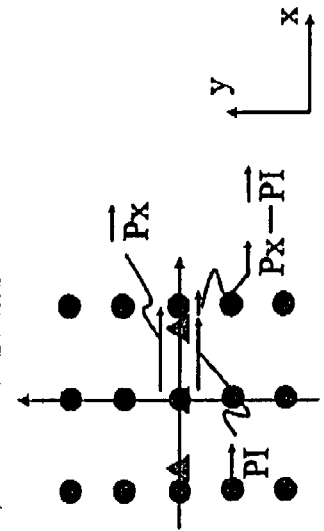

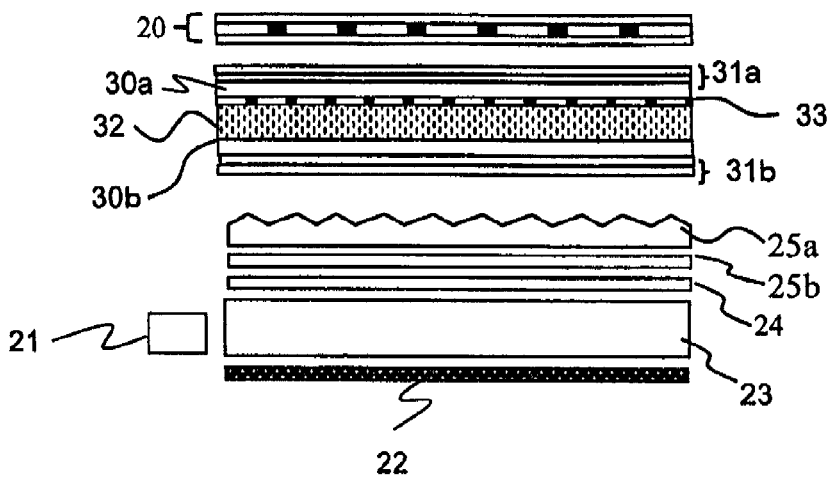
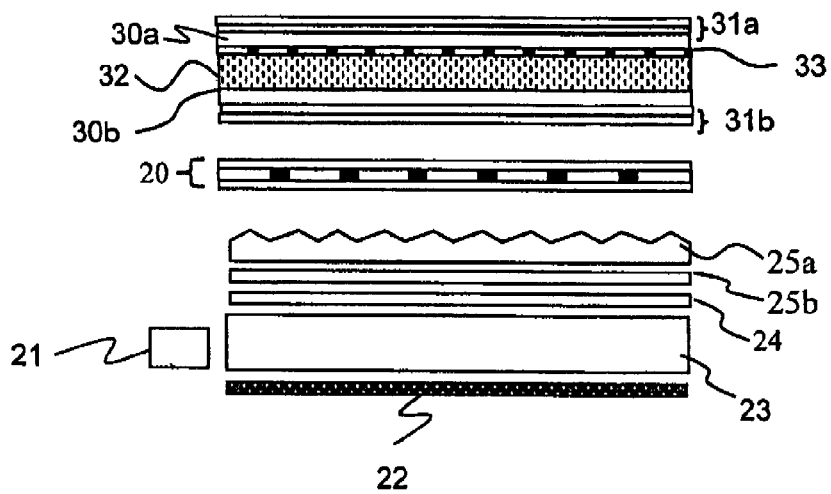
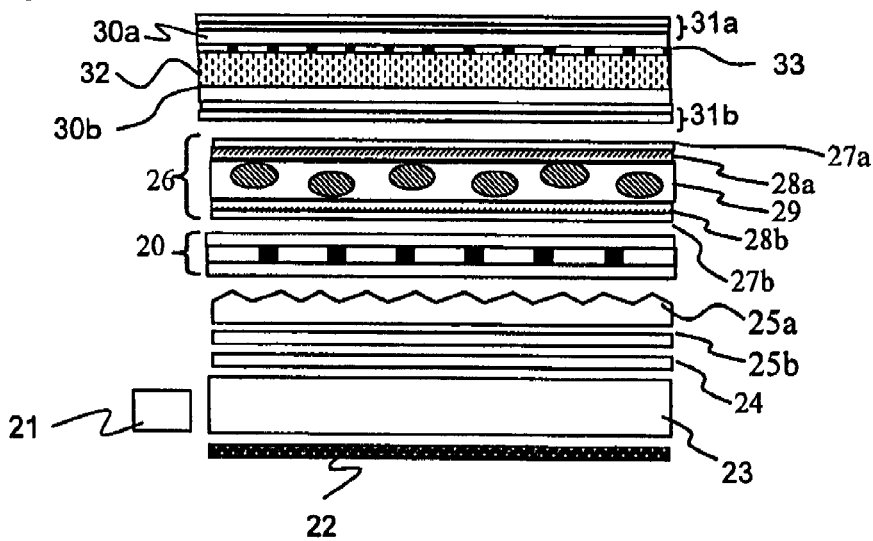

OPTICAL ELEMENT, AND ILLUMINATING OPTICAL DEVICE, DISPLAY DEVICE AND ELECTRONIC DEVICE USING THE SAME

This application is based upon and claims the benefit of priority from Japanese Patent Application No. 2006-267978 filed in Japan Patent Office on Sep. 29, 2006, the contents of which are hereby incorporated by reference.

BACKGROUND OF THE INVENTION (1) Field of the Invention

The present invention relates to an optical element called "microlouver" by which the range of the exit direction of a transmitted light beam is restricted. Further, the present invention relates to an illuminating optical device and a display device as represented by a liquid crystal display (LCD) or a plasma display using such an optical element.

(2) Description of the Related Art

Liquid crystal displays are used as display devices for various electronic devices such as mobile phones, Personal Digital Assistance (PDA), ATM (Automatic Teller Machine) or personal computers, and recently there are practical uses for liquid crystal display that have a wide, viewable area.

A liquid crystal display, whose display area is visible from a wide range of angles, has been found to be useful when a plurality of people together look at a display screen. However, in the case certain devices, such mobile phones, in which it is assumed that personal privacy is desired, the wide, viewable screen may sometimes allow unwanted third parties to view displayed information, which will be displeasing to the user. Further, in the case of an information processing terminal used by an unspecified number of the general public, it is necessary to prevent other people from peeping at displayed information, when highly confidential information such as personal information is displayed. Therefore, there has been developed a liquid crystal display that can be switched between a display area that has a narrower field of view and a display area that has a wider field of view (see Japanese Patent Laid-Open No. 10-197844, the thirty-fifth paragraph).

FIG. 1 shows one example of a liquid crystal display capable of switching between a display form having a narrow field of view and a display form having a wide field of view. Referring to FIG. 1, the liquid crystal display has display panel 100 composed of a plurality of pixels arrayed in a matrix, and microlouver 101 to be attached onto this display panel 100. Microlouver 101, as shown in FIG. 2, is configured in a manner such a periodic structure body, in which light absorption layer 102 and transparent layer 103 are alternately disposed, is sandwiched between two protective films 104, and the period of positioning light absorption layer 102 and transparent layer 103 is constant. In a light beam incident on transparent layer 103, only a light beam whose incident angle is equal to or smaller than $\theta/2$ (where $\theta$ is a visible angle) can pass through transparent layer 103. A light beam whose incident angle is larger than $\theta/2$ is absorbed in light absorption layer 102. The visible angle $\theta$ is determined by a thickness D and a pitch P of the period of the periodic structure body. The smaller the visible angle $\theta$, the higher is the directivity of a light beam which passes through microlouver 101.

In the display that has a narrow field of view, display panel 100 is used with microlouver 101 being attached to it. The region of a light beam visible from display panel 100 is restricted by microlouver 101. On the other hand, in the display that has a wide field of view, display panel 100 is used with microlouver 101 being removed. In this case, the visible region is determined by the visible angle of display panel 100.

By using polymer dispersed liquid crystal for display panel 100, the visible region can be enlarged.

Further, there is a liquid crystal display having a built-in microlouver. FIG. 3 shows a configuration of the main portion of the liquid crystal display.

Referring to FIG. 3, the liquid crystal display includes backlight unit 200 and LCD panel 203 illuminated with a light beam from backlight unit 200, and between backlight unit 200 and LCD panel 203, microlouver 201 and diffuser 202 are disposed.

LCD panel 203 includes a plurality of liquid crystal cells arrayed in a matrix having a constant pitch, and R (red), G (green) and B (blue) color filters are positioned in a predetermined order so as to correspond to positions of the liquid crystal cells. FIG. 4 shows an example of positioning the color filters. In this example of positioning, color filters 203a are positioned in a matrix in a region divided by black matrix 203b for absorbing light, and a pitch thereof is constant.

Microlouver 201, as shown in FIG. 5, has a periodic structure in which light absorption layer 201a and transparent layer 201b are disposed alternately. Diffuser 202 is formed of polymer dispersed liquid crystals and adapted to be able to switch between a transparent state in which an incident light beam exits, as it is, and a scattered state in which the incident light beam exits as a diffused light beam due to scattering. For diffuser 202, there is, for example, PNLC (Polymer Network LC) or PDLC (Polymer Dispersed Liquid Crystal).

FIG. 6 shows a light beam at a narrow field of view. At the narrow field of view, diffuser 202 is made transparent. Microlouver 201 restricts the range of the exit direction of the diffused light beam from backlight unit 200. A light beam which passes through microlouver 201, as is, passes through diffuser 202 and illuminates LCD panel 203.

FIG. 7 shows a light beam at a wide field of view. At the wide field of view, diffuser 202 is made to scatter. Microlouver 201 restricts the range of the exit direction of the diffused light beam from backlight unit 200. The light beam which passes through microlouver 201 is formed into a diffused light beam by diffuser 202. LCD panel 203 is illuminated with this diffused light beam from diffuser 202.

However, display devices using the microlouver described above have the following problems.

In the liquid crystal display shown in FIG. 1, because both display panel 100 and microlouver 101 have a periodic structure, the light beam which passes through microlouver 101 is formed into a form in which two, regular intensity distributions based on their periodic structure are superimposed one on the other, thereby producing Moire fringes that correspond to a difference between their spatial frequencies.

In the liquid crystal display shown in FIG. 3, because both LCD panel 203 and microlouver 201 have a periodic structure, Moire fringes that correspond to a difference between spatial frequencies of their periodic structure are produced.

FIG. 8 shows a production principle of Moire fringes, FIG. 8A shows the spatial arrangement of a microlouver having a periodic structure. FIG. 8B shows a spatial frequency of the microlouver in the two-dimensional coordinate system. FIG. 8C shows a spatial arrangement of a display element having a periodic structure. FIG. 8D shows a spatial frequency of the display element in the two-dimensional coordinate system. FIG. 8E shows that the spatial frequencies shown in FIGS. 8B and 8D are superimposed one on the other in the two-dimensional coordinate system.

The spatial frequency as shown in FIG. 8A obtained by a two-dimensional Fourier transform of the spatial arrangement having a repetitive period (PI) in the one-dimensional direction, as shown in FIG. 8B, has a one-dimensional, regular peak arrangement (shown by a triangular mark).

Coordinates of the peak in the two-dimensional coordinate system are provided by integral multiplication of a vector PI (I*PI). The value of the vector PI is equal to the inverse of the period of the microlouver.

On the other hand, the display element as shown in FIG. 8C, in which pixels are formed in a matrix, has a spatial arrangement with a period in the x-direction (Px) and a period in the y-direction (Py). The spatial frequency obtained by a two-dimensional Fourier transform, as shown in FIG. 8D, has a two-dimensional, regular peak (shown by a circular mark). Coordinates of the peak in the two-dimensional coordinate system are provided by integral multiplication of a vector Px and a vector Py (n*Px+m*Py).

Superimposing the spatial frequencies shown in FIGS. 8B and 8D one on the other, the peak arrangement is represented by the relationship shown in FIG. 8E. Coordinates of each peak in the two-dimensional coordinate system are provided by integral multiplication of a vector PI, Px and Py (I*PI+n*Px+m*Py).

In FIG. 8D, ({vector Px}−{vector Py}) forms the bases of Moire fringes. Further, when a screen that includes a picture element having three pixels of R, G and B is used, Moire fringes are produced even under the condition of ({vector 3Px}−{vector PI}).

The problem concerning Moire fringes arises not only between a display element and a microlouver, but when components having periodicity are stacked one on top of the other. For example, Moire fringes are produced even between a lens sheet having a plurality of lenses disposed on its surface and a microlouver.

SUMMARY OF THE INVENTION

An exemplary object of the present invention is to solve the problem described above to provide a microlouver capable of controlling production of Moire fringes.

In order to achieve the object described above, a microlouver according to an exemplary aspect of the present invention is an optical element that includes a periodic structure in which a transparent layer and a light absorption are layer alternately disposed on a plane with a constant, repetitive period, the light absorption layer restricting the range of the exit direction of a light beam passing through the transparent layer. The optical element is characterized in that the periodic structure includes a plurality of periodic structure portions divided in the direction which intersects the direction in which the transparent layer and the light absorption layer are repeatedly disposed, and at least a part of the plurality of periodic structure portions has a phase of spatial frequency that is different from a phase of spatial frequency of another part of the plurality of periodic structure portions. a plurality of periodic structure portions divided in the direction intersecting with the direction in which the transparent layer and the light absorption layer are repeatedly disposed, and at least a part of the plurality of periodic structure portions are different in phase of their spatial frequency from each other.

According to the configuration described above, light beams which pass through the periodic structure portions in which the phases of spatial frequency is different from each other are averaged. The effect of averaging light beams eliminates periodicity in the entire periodic structure portions. By eliminating the periodicity of an optical element (microlouver) in such a manner, production of Moire fringes caused by a phase difference in spatial frequency between the optical element, and a display panel or a lens sheet having periodicity can be reduced.

According to the present invention as described above, by averaging light beams, the periodicity of the optical element (microlouver) can be eliminated to control production of Moire fringes, thereby high-quality display images or illumination can be provided.

The above and other objects, features, and advantages of the present invention will become apparent from the following description with reference to the accompanying drawings which illustrate examples of the present invention.

BRIEF DESCRIPTION OF THE DRAWINGS

In the accompanying drawings:

FIG. 8A is a schematic diagram illustrating spatial arrangement of a microlouver having a periodic structure;

FIG. 8B is a view illustrating a spatial frequency of the microlouver shown in FIG. 8A in the two-dimensional coordinate system;

FIG. 8C is a schematic diagram illustrating spatial arrangement of a display element having a periodic structure;

FIG. 8D is a view illustrating a spatial frequency of the display element shown in FIG. 8C in the two-dimensional coordinate system;

FIG. 8E is a view showing that the spatial frequencies shown in FIGS. 8B and 8D are superposed one on the other in the two-dimensional coordinate system;

FIG. 27 is a schematic diagram illustrating a configuration of a display device on which display screen the microlouver of the present invention is provided;

FIG. 28 is a schematic diagram illustrating a configuration of a first display device inside of which the microlouver of the present invention is mounted;

FIG. 29 is a schematic diagram illustrating a configuration of a second display device inside of which the microlouver of the present invention is mounted;

DETAILED DESCRIPTION OF THE PREFERRED EMBODIMENTS

First Exemplary Embodiment

Figure 9:
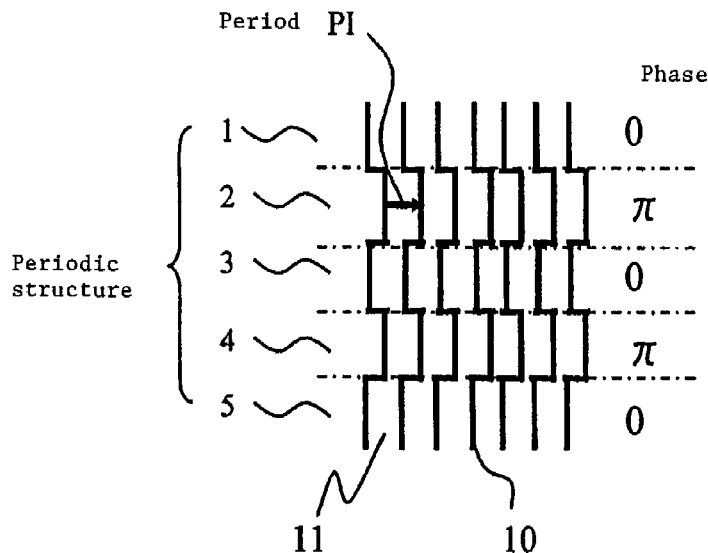
FIG. 9 is a schematic diagram illustrating a periodic structure of a microlouver of a first exemplary embodiment according to the present invention.
Figure 10:
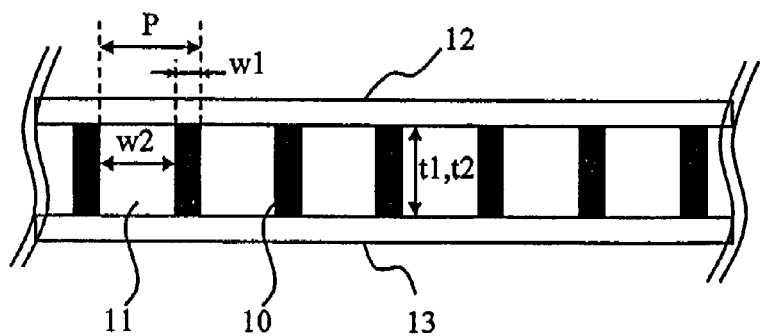
FIG. 10 is a cross-sectional view of the microlouver shown in FIG. 9.

FIG. 9 is a schematic diagram illustrating a periodic structure of a microlouver of a first exemplary embodiment of an optical element according to the present invention. FIG. 10 is a cross-sectional view of the microlouver.

The microlouver of this exemplary embodiment, as shown in FIG. 10, is configured in a manner that is configured such that a periodic structure body, in which light absorption layer 10 and transparent layer 11 are alternately disposed, is sandwiched and held between two transparent substrates 12 and 13. The periodic structure body, as shown in FIG. 9, has a plurality of periodic structures 1 to 5. In each of periodic structures 1 to 5, a repetitive period PI in a portion composed of light absorption layer 10 and transparent layer 11 is the same. The period PI corresponds to a pitch P in a portion composed of light absorption layer 10 and transparent layer 11 shown in FIG. 10. Further, a width w1 and a thickness t1 of light absorption layer 10, and a width w2 and a thickness t2 (=t1) of transparent layer 11 are the same among periodic structures 1 to 5.

In periodic structures 1, 3 and 5, each phase of their spatial frequency is identical to each other. In periodic structures 2 and 4, each phase of their spatial frequency is identical to each other, and each phase of spatial frequency of periodic structures 2, 4 is different from each phase of spatial frequency of periodic structures 1, 3 and 5 by π. Here, the phase of spatial frequency of periodic structures 1, 3 and 5 is expressed by "0", and the phase of spatial frequency of periodic structures 2 and 4 is expressed by "π".

Figure 11A:
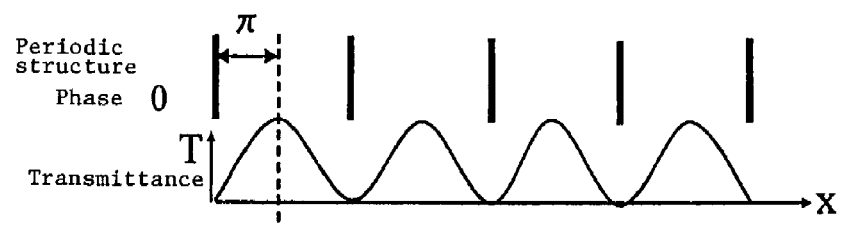
FIG. 11A is a view for describing a transmission factor of a first periodic structure having a phase of spatial frequency of "0"
Figure 11B:
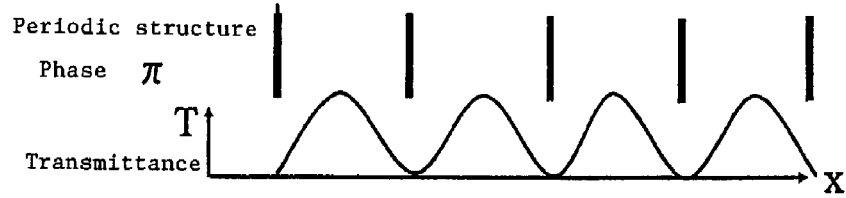
FIG. 11B is a view for describing a transmission factor of a second periodic structure having a phase of spatial frequency of "π"

FIG. 11A shows a transmission factor of a first periodic structure having the phase of spatial frequency of "0". FIG. 11B shows a transmission factor of a second periodic structure having the phase of spatial frequency of "π". As shown, the x-axis shows the direction of a wavevector of the periodic structure (the direction of the x-axis in FIG. 8). The light absorption layer and the transparent layer are alternately positioned in the direction of the x-axis. The transmission factor T represents a transmission factor at each local position, when the periodic structure is illuminated from beneath. In addition, here, the transmission factor is expressed by a clean, sinusoidal distribution, but at the extreme, the transmission factor, except at the light absorption layer, may sometimes have a constant, rectangular distribution.

The first and second periodic structures both have sinusoidal transmission characteristics in which a transmittance is highest at a central portion of the transparent layer and gradually moves lower and closer on the side having the light absorption layers (portions shown by black color) until the transmittance reaches zero at a position where the light absorption layer is formed. When the first and second periodic structures are disposed adjacent to each other, a light beam from the first periodic structure and a light beam from the second periodic structure are averaged due to the effect of temporal and spatial integration in human vision. As the result, when the first and second periodic structures are disposed adjacent to each other, the transmission factor becomes constant, and periodicity is eliminated. When a person having visual acuity of 1.0 observes, an object resolution of human eye is 1.5 mm at a distance of 5 m, 0.3 mm at a distance of 1 m, and 0.15 mm at a distance of 50 cm. Accordingly, in order to average the light beams due to the effect of temporal and spatial integration in human vision, it is desirable that a size of the first and second periodic structures is set as follows. When seen at a distance of 5 m, the size of the periodic structure is not larger than 1.5 mm. When seen at a distance of 1 m in application, the size of the periodic structure is not larger than 0.3 mm. When seen at a distance of 50 cm in application, the size of the periodic structure is not larger than 0.15 mm. In addition, when observed under any possible condition, the size of the periodic structure may be not larger than about 0.1 mm.

In the microlouver shown in FIG. 9, periodic structures 1, 3 and 5 emit a light beam based on the transmission characteristics shown in FIG. 11A, and periodic structures 2 and 4 emit a light beam based on the transmission characteristics shown in FIG. 11B. The light beams from these periodic structures 1 to 5 are averaged, resulting in elimination of periodicity.

Figure 4:
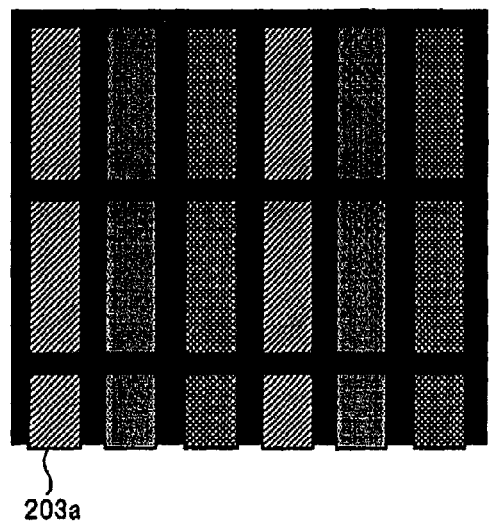
FIG. 4 is a schematic diagram illustrating an exemplary embodiment of positioning a color filter.
Figure 5:
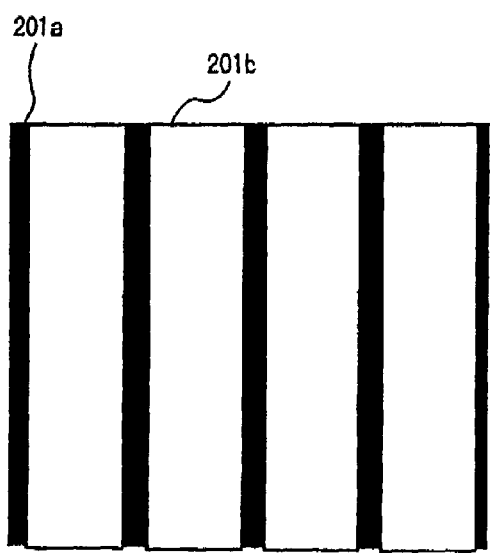
FIG. 5 is a schematic diagram illustrating spatial arrangement of the microlouver shown in FIG. 3.
Figure 6:
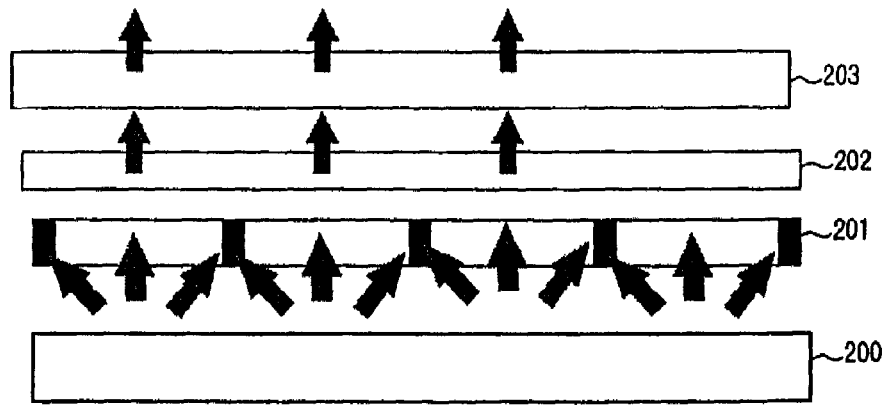
FIG. 6 is a schematic diagram illustrating a light beam of the liquid crystal display shown in FIG. 3 when the field of view is narrow.
Figure 7:
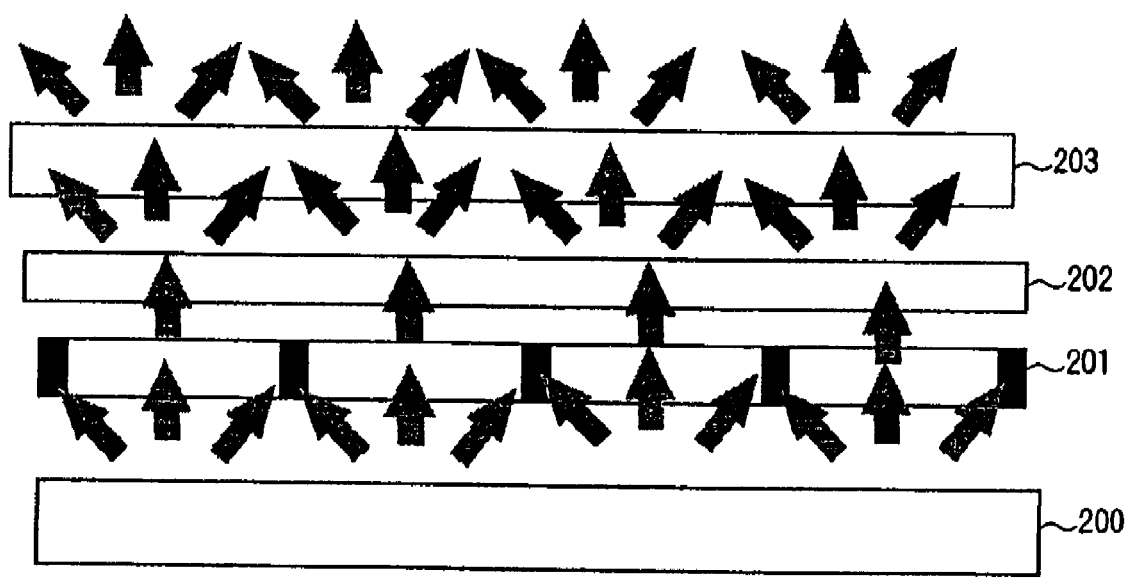
FIG. 7 is a schematic diagram illustrating a light beam of the liquid crystal display shown in FIG. 3 when the field of view is wide.

As described above, in the microlouver of this exemplary embodiment, because the phases of spatial frequency of the periodic structures adjacent to each other are adapted to be different from each other by $\pi$, periodicity is eliminated in the entire periodic structure body, due to the effect of averaging the light beams. Therefore, when the microlouver of this exemplary embodiment is applied to a display device including a display panel having periodicity in spatial arrangement of pixels (for example, the display device shown in FIG. 1 or 4), since the light beam that has been passed through the microlouver has no regular intensity distribution (has no periodicity), production of Moire fringes is reduced.

Second Exemplary Embodiment

Figure 12:
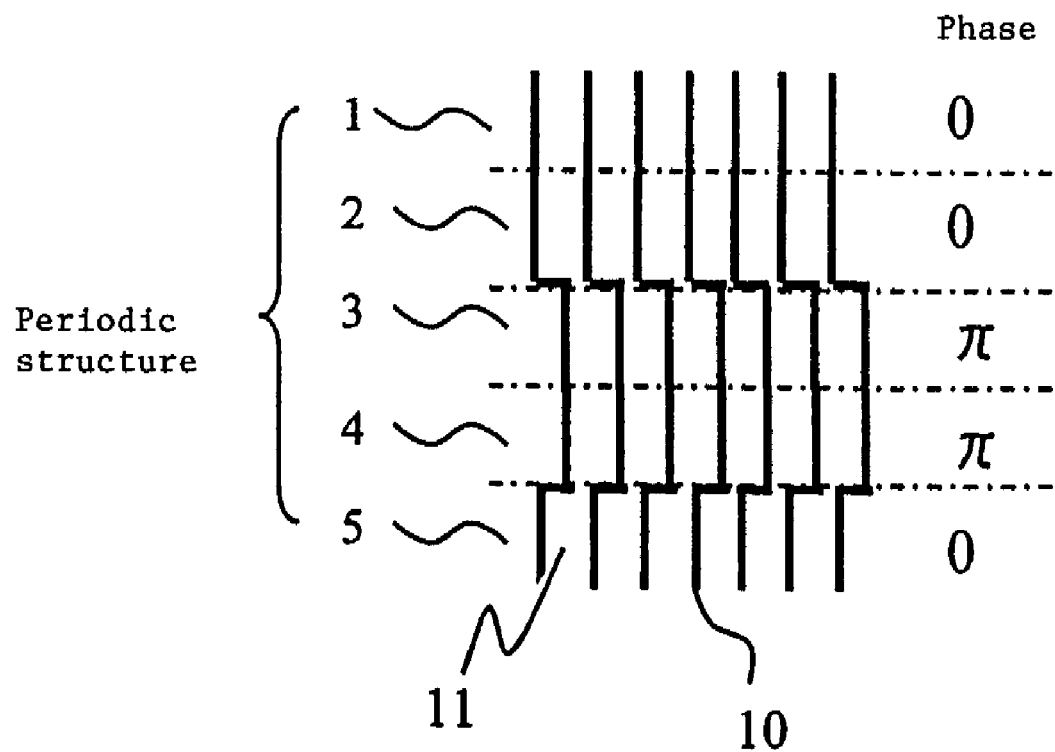
FIG. 12 is a schematic diagram illustrating a periodic structure of a microlouver of a second exemplary embodiment according to the present invention.

FIG. 12 is a schematic diagram illustrating a periodic structure of a microlouver of a second exemplary embodiment according to the present invention. Also the microlouver of this exemplary embodiment is configured in a manner that is configured such that a periodic structure body, in which light absorption layer 10 and transparent layer 11 are alternately disposed, is sandwiched and held between two transparent substrates 12 and 13 as shown in FIG. 10, but the relationship among phases of spatial frequency of a plurality of periodic structures 1 to 5 constituting the periodic structure body is different from that of the first exemplary embodiment. In this exemplary embodiment, arrangement of the periodic structures having the phase of "0" and the periodic structures having the phase of "$\pi$" is determined based on progression generation rules or a random number.

The structure shown in FIG. 12 is a part of a periodic structure body in which arrangement of the periodic structures having the phase of "0" and the periodic structures having the phase of "$\pi$" is determined based on progression generation rules or a random number. Also in this exemplary embodiment, similarly to the first exemplary embodiment, a repetitive period PI in a portion composed of light absorption layer 10 and transparent layer 11 is the same in each of periodic structures 1 to 5. Further, the size of each periodic structure, as described above, depending on applications, is set to be in the range of not larger than 0.3 mm, not larger than 0.15 mm or not larger than 0.1 mm. Between the periodic structures having the phase of spatial frequency that is different by $\pi$, each periodic structure has the transmission characteristics shown in FIG. 11. The light absorption layer and the transparent layer are alternately disposed in the direction of the x-axis in FIG. 11.

In periodic structures 1, 2 and 5, the phase of their spatial frequency is identical to each other. In periodic structures 3 and 4, the phase of their spatial frequency is identical to each other, and the phase of spatial frequency of periodic structures 3 and 4 is different from the phase of spatial frequency of periodic structures 1, 2 and 5 by $\pi$. Also in this structure, similarly to that of the first exemplary embodiment, between the periodic structures having the phase of spatial frequency that is different from each other, the light beam from each periodic structure is averaged. Therefore, when the microlouver of this exemplary embodiment is applied to a display device including a display panel having periodicity in spatial arrangement of pixels (such as the display device shown in FIG. 1 or 4), production of Moire fringes can be controlled.

Further, in this exemplary embodiment, by determining the phase of spatial frequency of the plurality of periodic structures constituting the periodic structure body based on progression generation rules or a random number, periodicity in the x-direction (the x-direction in FIG. 8), as well as periodicity in the oblique direction can be eliminated.

As for the progression generation rules, there are, for example, generation rules of the Fibonacci series (nonperiodic series). An example of determining the phase of the periodic structure using the generation rules of the Fibonacci series will be described below.

Figure 13:
FIG. 13 is a schematic diagram illustrating a unit structure L having a phase of "0" and a unit structure S having a phase of "π" constituting the periodic structure of the microlouver shown in FIG. 12.

FIG. 13 schematically illustrates a unit structure L having the phase of "0" and a unit structure S having the phase of "$\pi$". A difference in phase of spatial frequency between the unit structure L and the unit structure S is $\pi$. By arranging a plurality of the unit structures L in the constant direction, periodic structures 1, 2 and 5 shown in FIG. 12 can be formed. By arranging a plurality of the unit structures S in the constant direction, periodic structures 3 and 4 shown in FIG. 12 can be formed. In the configuration shown in FIG. 12, the phases of spatial frequency of periodic structures 1 to 5 are determined to be 0, 0, $\pi$, $\pi$ and 0. The generation rules of the Fibonacci series are used to determine the phase.

In determination of the phase using the generation rules of Fibonacci series, a first generation is expressed by "L", a second generation is expressed by "S", and a third generation is expressed by "LS". For subsequent generations, "L" is transformed to "LS" and "S" is transformed to "L" for the prior generation. Following these transformation rules, for subsequent generations, a fourth generation is "LSL", a fifth generation is "LSLLS", and a sixth generation is "LSLLSLSL".

Figure 14:
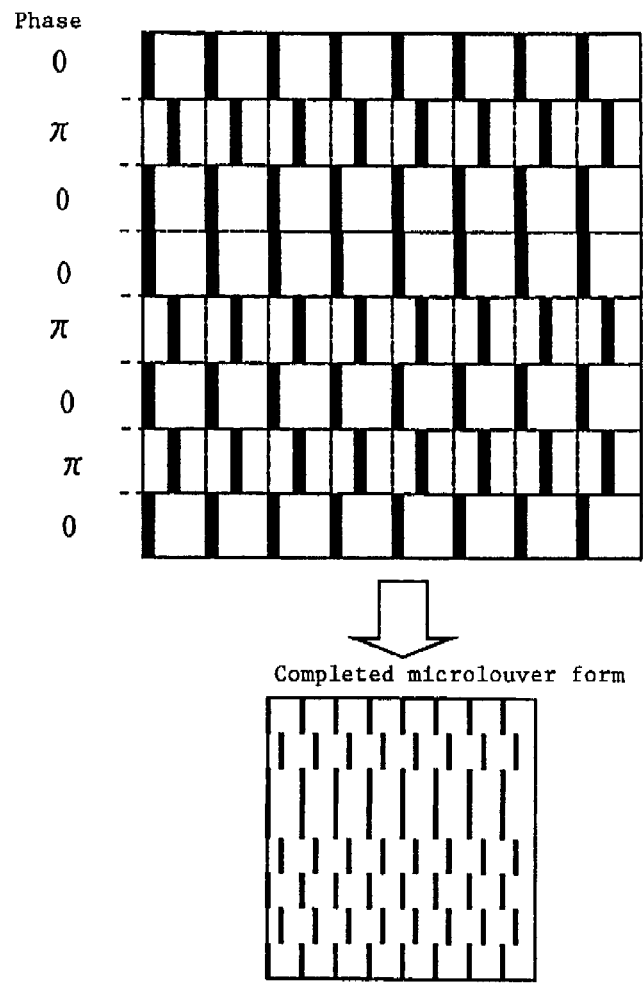
FIG. 14 is a schematic diagram illustrating a periodic structure of a microlouver made on the basis of the sixth generation positioning rules.

FIG. 14 schematically illustrates a periodic structure of a microlouver made on the basis of the sixth generation positioning rules. In this exemplary embodiment, a periodic structure body includes eight periodic structures, a phase of spatial frequency of each periodic structure is, from the upper side of FIG. 14, 0, $\pi$, 0, 0, $\pi$, 0, $\pi$, 0. In addition, as shown in the lower side of FIG. 14, between the periodic structures having the phase of spatial frequency different from each other, the light absorption layers are separated from each other.

In the phase determination using the generation rules of the Fibonacci series described above, the number by which the periodic structure is divided by the unit structure is increased, so that the periodic structure in the x-direction is formed into a nonperiodic structure, thereby periodicity in the x-direction is eliminated.

Next, a method for determining the phase using a random number will be described.

In phase determination using the random number, the random number is generated, for example, in the range from 0 to 1. When a value of the random number is smaller than 0.5, the periodic structure is made to have the phase of "0", and when a value of the random number is not smaller than 0.5, the periodic structure is made to have the phase of "π". In such manner, based on the value of the random number generated, the phase of spatial frequency of each periodic structure constituting the periodic structure body is determined. By randomly arranging the periodic structures having the phase of "0" and the periodic structures having the phase of "π", not only periodicity in the x-direction, but also periodicity in the oblique direction can be eliminated.

Third Exemplary Embodiment

Figure 15:
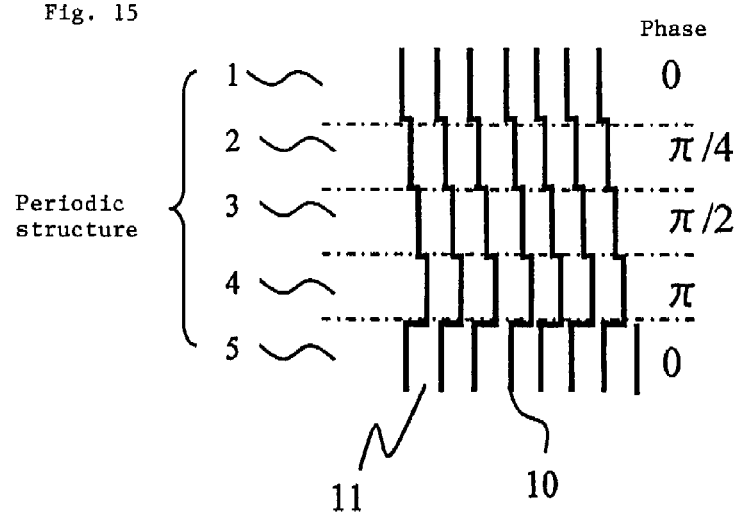
FIG. 15 is a schematic diagram illustrating a periodic structure of a microlouver of a third exemplary embodiment according to the present invention.

FIG. 15 is a schematic diagram illustrating a periodic structure of a microlouver of a third exemplary embodiment according to the present invention. Also the microlouver of this exemplary embodiment is configured in a manner that is configured such that a periodic structure body, in which light absorption layer 10 and transparent layer 11 are alternately disposed, is sandwiched and held between two transparent substrates 12 and 13 as shown in FIG. 10, but the relationship among phases of spatial frequency of a plurality of periodic structures 1 to 5 constituting the periodic structure body is different from that of the first exemplary embodiment. In this exemplary embodiment, the periodic structure body is configured by using four kinds of periodic structure: a periodic structure having a phase of "0", a periodic structure having a phase of "π/4", a periodic structure having a phase of "π/2", and a periodic structure having a phase of "π".

In the configuration shown in FIG. 15, periodic structures 1 and 5 are adapted to be periodic structures having the phase of "0", periodic structure 2 is adapted to be a periodic structure having the phase of "π/4", periodic structure 3 is adapted to be a periodic structure having the phase of "π/2", and periodic structure 4 is adapted to be a periodic structure having the phase of "π". That is, the phases of spatial frequency of periodic structures 2, 3 and 4 are different from the phases of spatial frequency of periodic structures 1 and 5 by π/4, π/2 and π, respectively. Also in this exemplary embodiment, similarly to the first exemplary embodiment, a repetitive period PI in a portion composed of light absorption layer 10 and transparent layer 11 is the same in each of periodic structures 1 to 5. Further, the size of each periodic structure is adapted to be no larger than about 0.1 mm. Between the periodic structures having the phase of spatial frequency different from each other, each periodic structure has the transmission characteristics that depend on a phase difference (between the periodic structures that have a phase in which the difference from one structure to the other structure is represented by π, the transmission characteristics are as shown in FIG. 11). The light absorption layer and the transparent layer are alternately disposed in the x-direction in FIG. 11.

Also in the structure of this exemplary embodiment, similarly to that of the first exemplary embodiment, the light beam from each periodic structure is averaged between the periodic structures that each have phases of spatial frequency that are different from each other. Therefore, the microlouver of this exemplary embodiment is applied to a display device including a display panel having periodicity in spatial arrangement of pixels (such as the display device shown in FIG. 1 or 4), thereby production of Moire fringes can be controlled.

Further, by determining the phase of spatial frequency of each periodic structure constituting the periodic structure body based on a random number, not only periodicity in the x-direction, but also periodicity in the oblique direction can be eliminated.

Next, a method for determining the phase using the random number will be described.

In the phase determination using the random number, the random number is generated, for example, in a range from 0 to 1. When a value of the random number is smaller than 0.25, the periodic structure is made to have the phase of "0". When a value of the random number is not smaller than 0.25 and but is smaller than 0.5, the periodic structure is made to have the phase of "π/4". When a value of the random number is not smaller than 0.5 and but is smaller than 0.75, the periodic structure is made to have the phase of "π/2". When a value of the random number is not smaller than 0.75, the periodic structure is made to have the phase of "π". In such manner, based on the value of the random number generated, the phase of spatial frequency of each periodic structure constituting the periodic structure body is determined.

Figure 16:
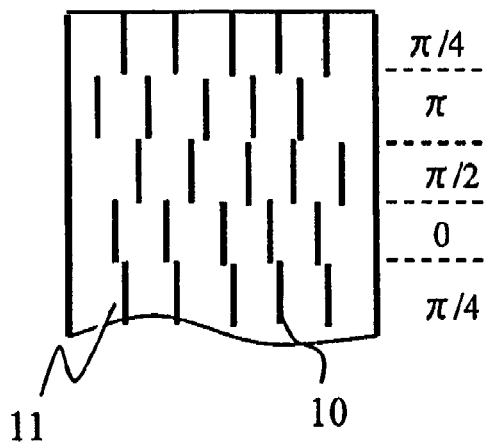
FIG. 16 is a schematic diagram illustrating a periodic structure of a microlouver when a phase is determined by using a random number.

FIG. 16 schematically illustrates the periodic structure of the microlouver, when the phase is determined by using the random number. In this exemplary embodiment, four kinds of unit structure: a first unit structure having the phase of "0", a second unit structure having the phase of "π/4", a third unit structure having the phase of "π/2", and a fourth unit structure having the phase of "π" are used. The periodic structure body includes five periodic structures, and the phases of spatial frequency of periodic structures are, from the upper side of FIG. 16, π/4, π, π/2, 0 and π/4, respectively.

In addition, the unit of the phase of spatial frequency is not limited to four vales: 0, π/4, π/2 and π, the unit of the phase may be a value other these values. Further, the periodic structure is not limited to four kinds of periodic structure having phase that are different from each other, and the periodic structure may include a structure configured with a phase of any value or a combination of any number of phases as the microlouver, as long as the structure can eliminate periodicity at least in the x-direction.

Fourth Exemplary Embodiment

Figure 17:
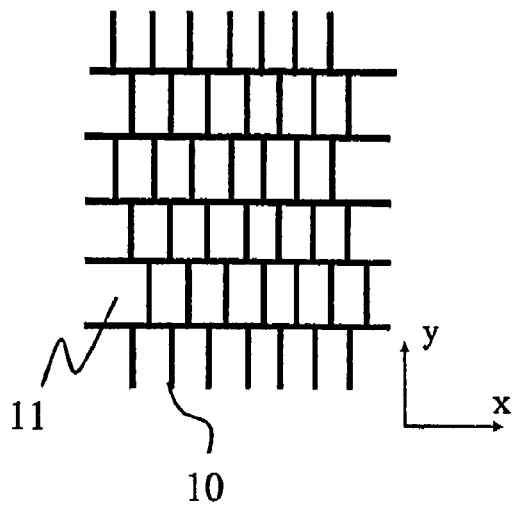
FIG. 17 is a schematic diagram illustrating a periodic structure of a microlouver of a fourth exemplary embodiment according to the present invention.

FIG. 17 is a schematic diagram illustrating a periodic structure of a microlouver of a fourth exemplary embodiment according to the present invention. Also the microlouver of this exemplary embodiment is configured in a manner that is configured such that a periodic structure body, in which light absorption layer 10 and transparent layer 11 are alternately disposed, is sandwiched and held between two transparent substrates 12 and 13 as shown in FIG. 10, but the periodic structure body is different from that of the first exemplary embodiment in having the periodic structures in both of the x-direction and y-direction, respectively.

Specifically, the microlouver is a periodic structure in which light absorption layer 10 and transparent layer 11 are alternately disposed in the x-direction (corresponding to the x-axis direction shown in FIG. 11), and includes the periodic structure having a phase of "0" and the periodic structure having a phase of "π". The periodic structures having the phase of "0" and the periodic structures having the phase of "π" are alternately disposed in the y-direction. Then, between the periodic structure having the phase of "0" and the periodic structure having the phase of "π", light absorption layer 10 is provided.

Also in this exemplary embodiment, similarly to the first exemplary embodiment, a repetitive period PI in a portion composed of light absorption layer 10 and transparent layer 11 is the same in each periodic structure having the phase of "0" and in each periodic structure having the phase of "π". Further, the size of each periodic structure, depending on applications, as described above, is set to be in the range that is not larger than 0.3 mm, or not larger than 0.15 mm, desirably in a range that is not larger than 0.1 mm. Between the periodic structures having phases of spatial frequency that are different from each other, each periodic structure has transmission characteristics that depend on the difference in phase (see FIG. 11).

Because the microlouver of this exemplary embodiment includes the periodic structures in each direction of the x-direction and the y-direction, the range of the exit direction is restricted for each x-direction and for each y-direction.

Further, because of the configuration in which, in the x-direction, the periodic structure having the phase of "0" and the periodic structure having the phase of "π" are alternately disposed, similarly to that of the first exemplary embodiment, the light beam from each periodic structure is averaged between one periodic structure whose phase of spatial frequency is different from the phase of spatial frequency of another periodic structure. Therefore, the microlouver of this exemplary embodiment is applied to a display device including a display panel having periodicity in spatial arrangement of pixels (such as the display device shown in FIG. 1 or 4), and thereby production of Moire fringes in the x-direction can be controlled.

Further, because the periodic structure is configured in a manner in which, in the y-direction, light absorption layer 10 and transparent layer 11 are alternately disposed, Moire fringes are produced as a result of the relationship with the periodic structure of the display panel. The period of the periodic structure in the y-direction is determined so as to reduce the size (width) of these Moire fringes produced in the y-direction, so that it is difficult to identify.

The period of the periodic structure in the y-direction will be specifically described below.

Figure 18A:
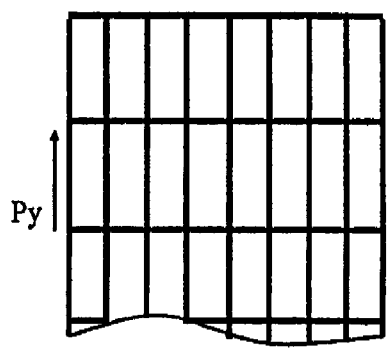
FIG. 18A is a schematic diagram illustrating spatial arrangement of a display panel having a periodic structure.
Figure 18B:
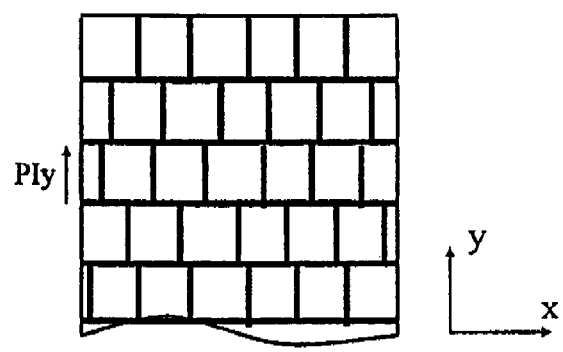
FIG. 18B is a schematic diagram illustrating spatial arrangement of the microlouver shown in FIG. 17.

FIG. 18A illustrates spatial arrangement of the display panel having the periodic structure. FIG. 18B illustrates spatial arrangement of the microlouver of this exemplary embodiment.

Let Py be a repetitive period of the display panel in the y-direction and let Ply be a repetitive period of the microlouver in the y-direction. Increasing a value of [{vector Py}−{vector PIy}] can increase the number of Moire fringes per unit length and may decrease the size (width) of the Moire fringes. In this exemplary embodiment, the repetitive period Ply of the microlouver in the y-direction is determined so that the size (width) of Moire fringes is set to be, depending on applications of use (observation position), in the range that is not larger than 0.3 mm, not larger than 0.15 mm, or not larger than 0.1 mm of resolution of human eye. This ensures that an observer can not identify Moire fringes in the y-direction.

Further, the periods in the y-direction and the x-direction may be made to coincide with each other. This allows visible angles in the x and y-direction, that is, in the vertical and horizontal direction to coincide with each other.

Also in the microlouver of this exemplary embodiment, similarly to that of the first exemplary embodiment, a light beam from each periodic structure is averaged, and thereby periodicity of the microlouver is eliminated. Therefore, the microlouver of this exemplary embodiment is applied to a display device including a display panel having periodicity in spatial arrangement of pixels (such as the display device shown in FIG. 1 or 4), and thereby production of Moire fringes can be controlled.

Further, owing to the microlouver of this exemplary embodiment, because the range of an exit direction is restricted not only in the x-direction, but also in the y-direction, the visible region of a display device can be restricted in both the x-direction and the y-direction. An existing, two-dimensional microlouver which restricts the visible region in both the x-direction and the y-direction is configured in a manner in which two microlouvers: a microlouver in the x-direction and a microlouver in the y-direction, are laid one on another, resulting in an increased cost. The microlouver of this exemplary embodiment is configured in a manner in which a two-dimensional microlouver structure is formed on the same face, and thereby the cost can be decreased less than that of the existing one. Further, the two-dimensional microlouver can be formed in the form of one layer, which can make the microlouver thinner.

In the first to third exemplary embodiments described above, the light absorption layer may be formed continuously between each of the periodic structures, or formed in isolation.

The microlouver of the present invention described above is not limited to the configuration as shown, and may be appropriately changed in configuration without departing from the spirit and scope of the present invention in which a local portion of the periodic structure includes a plurality of periodic structures having a difference in phase of spatial frequency therebetween.

Further, in the structure in which phases of spatial frequency of the periodic structures adjacent to each other are different from each other, by changing the width of the light absorption layer or the transparent layer, the phases of spatial frequency may be made different. For example, in the configuration shown in FIG. 9, by making the width of the light absorption layer (or the transparent layer) in periodic structure 1 different from the width of the light absorption layer (or the transparent layer) in periodic structure 2, the structure in which the phases of spatial frequency are different is realized.

Next, a method for manufacturing the microlouver of the present invention will be described.

FIGS. 19A to 19F illustrate a series of manufacturing processes of the microlouver of the present invention. First, on transparent substrate 50, transparent photopolymer layer 51 is formed (see FIG. 19A). As for a method for forming transparent photopolymer layer 51, for example, a film formation method such as a slit die coater, a wire coater or dry film transfer can be used. Further, for transparent photopolymer layer 51, chemically amplified negative photoresist from MicroChem Corp. which manufactures chemicals (brand name: SU-8) can be used. Because this resist has a comparatively small molecular weight before exposure, it dissolves very readily in a cyclopentanone solvent, a propylene glycol methyl ether acetate (PEGMEA) solvent, a gamma butyl lactone (GBL) solvent, or an isobutyl ketone (MIBK) solvent. Therefore, thick film formation is easy, so that transparent photopolymer layer 51 having a thickness of 100 to 200 μm can be formed.

Figure 19A:
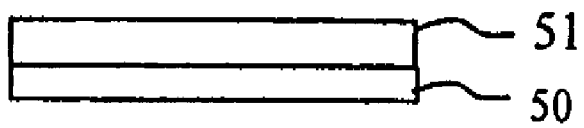
FIG. 19A is a view for describing a series of manufacturing processes of the microlouver according to the present invention.
Figure 19B:
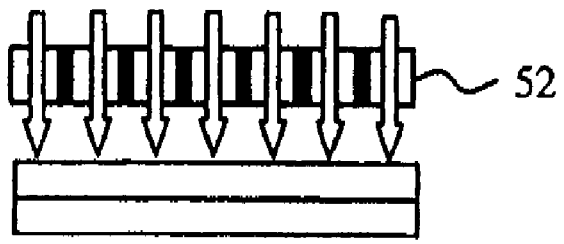
FIG. 19B is a view for describing a series of manufacturing processes of the microlouver according to the present invention.

Next, with using mask 52, transparent photopolymer layer 51 is patterned (see FIG. 19B). Mask 52 has a pattern corresponding to the spatial arrangement of the transparent layer and the light absorption layer of the microlouver described in the first to fourth exemplary embodiment (arrangement of a transmission region and a light shielding region). This patterning process is a well known process in the photolithographic technique, and various exposure systems such as a stepper exposure system or a contact exposure system can be used.

Figure 19C:
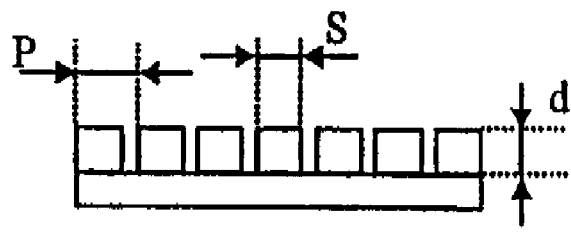
FIG. 19C is a view for describing a series of manufacturing processes of the microlouver according to the present invention.

Patterning provides a pattern in which a transparent layer having a width S and a thickness d is formed with a pitch P in the constant direction as shown in FIG. 19C. This transparent layer forms the transparent layer of the microlouver. Between the transparent layers, a surface of transparent substrate 50 is exposed. The thickness d is in a range from 100 μm to 200 μm. The width S is in a range from 50 μm to 70 μm. The pitch P is in a range from 50 μm to 90 μm. The width (space) between each of the transparent layers is in a range from 10 μm to 20 μm.

Figure 19D:
FIG. 19D is a view for describing a series of manufacturing processes of the microlouver according to the present invention.

Next, gaps between each transparent layer of the patterned transparent photopolymer layers are filled with curable material 53 (see FIG. 19D). In order to fill the gaps with curable material 53, a coating and filling method that uses a squeegee or coater may be used. To prevent insufficient filling of the curable material from occurring, it is desirable that the filling is conducted in a vacuum (in a vessel having a sufficiently reduced atmosphere pressure).

Figure 19E:
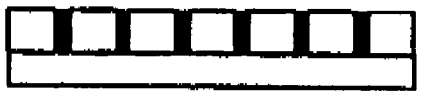
FIG. 19E is a view for describing a series of manufacturing processes of the microlouver according to the present invention.

Next, after curable material 53 is etched to expose a surface of the transparent photopolymer layer, curable material 53 is cured (see FIG. 19E). In addition, in the filling process of the curable material, if the curable material does not adhere to the surface of the transparent photopolymer layer, the etching process may be omitted.

Figure 19F:
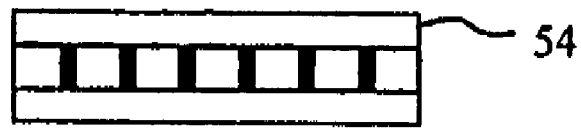
FIG. 19F is a view for describing a series of manufacturing processes of the microlouver according to the present invention.

Finally, transparent substrate 54 is attached onto the transparent photopolymer layers and curable material 53 (see FIG. 19F). Transparent substrate 54 may be attached onto the transparent photopolymer layers and curable material 53 by laminate. Further, transparent substrate 54 may be attached onto the transparent photopolymer layers and curable material 53 through a transparent adhesive layer. Moreover, on a surface of transparent substrate 54, a hard coat layer or an anti-reflection film may be formed to protect against scratch.

Here, assuming that the width S of the transparent layer is 50 μm, the width of the light absorption layer is 10 μm, and the thickness is 200 μm. Because, according to this manufacturing method, the refractive index of the transparent photopolymer is approximately 1.6, a microlouver having a visible region of ±22.8° relative to the origin defined by the normal direction of the microlouver can be formed. Further, in each of the exemplary embodiments described above, each of the periodic structures has the same period, but has a different phase, and therefore each of the periodic structures has the same visible region.

Next, another method for manufacturing the microlouver of the present invention will be described.

FIGS. 20A to 20E illustrate a series of manufacturing processes of another method for manufacturing the microlouver of the present invention.

Figure 20A:
FIG. 20A is a process drawing for describing another manufacturing method of the microlouver of the present invention.
Figure 20B:
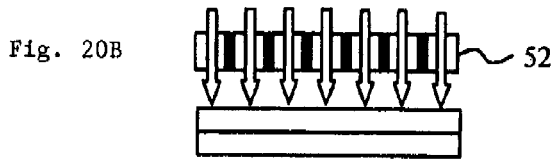
FIG. 20B is a process drawing for describing another manufacturing method of the microlouver of the present invention.
Figure 20C:
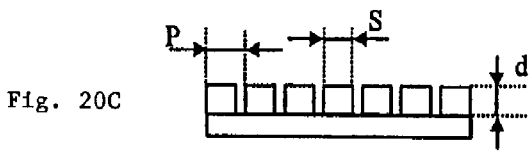
FIG. 20C is a process drawing for describing another manufacturing method of the microlouver of the present invention.

First, on transparent substrate 50, transparent photopolymer layer 51 is formed (see FIG. 20A). Next, by using mask 52, transparent photopolymer layer 51 is patterned (see FIG. 20B), and a pattern in which a transparent layer having a width S and a thickness d is formed with a pitch P in the constant direction as shown in FIG. 20C is provided. These processes are the same as the processes shown in FIGS. 19A to 19C.

Figure 20D:
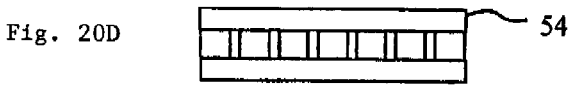
FIG. 20D is a process drawing for describing another manufacturing method of the microlouver of the present invention.

Next, on patterned transparent photopolymer layers 51, transparent substrate 54 is attached (see FIG. 20D). By pressure burning or UV compression, transparent substrate 54 is laminated on transparent photopolymer layer 51. If transparent substrate 54 is not completely attached to patterned transparent photopolymer layer 51, between transparent substrate 54 and patterned transparent photopolymer layers 51, an adhesive layer is provided, and the layers are laminated by the pressure burning or the UV compression. Accordingly, this ensures that transparent substrate 54 is firmly attached to patterned transparent photopolymer layers 51. The adhesive layer may be the same photopolymer as transparent photopolymer layer 51.

Figure 20E:
FIG. 20E is a process drawing for describing another manufacturing method of the microlouver of the present invention.

Next, in an atmosphere or a vacuum atmosphere, curable material 53 is injected into each gap of patterned transparent photopolymer layers 51 using the capillary phenomenon (see FIG. 20E). Subsequently, injected curable material 53 is cured by UV or heat, completing the microlouver. Curing curable material 53 allows the transparent substrate to be more firmly attached, and as the result, a failure such as peeling of the transparent substrate can be prevented. Further, curing curable material 53 can prevent a failure such as leakage of the curable material from occurring. As for curable material 53, material of non-solvent type is desirable. In addition, if the curable material is of solvent type, a solvent that becomes vaporized after filling and whose volume contracts in the filled region, is produced and the light shielding characteristics in the entire substrate having regions that are filled with the curable material (light absorption layer), become uneven. As the result, display irregularity is generated.

Next, another method for manufacturing the microlouver of the present invention will be described.

Figure 21:
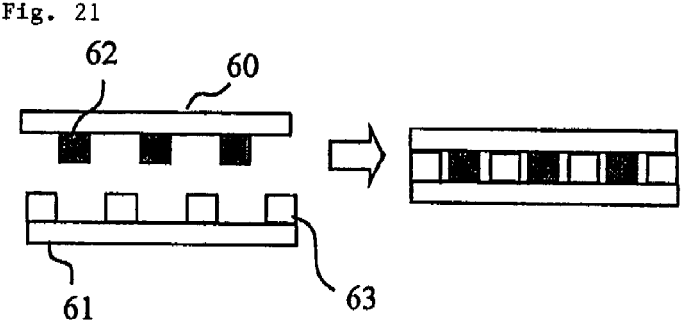
FIG. 21 is a view for describing still another manufacturing method of the microlouver of the present invention.

As for another manufacturing method, also, there is a method by which the microlouver is manufactured using processes shown in FIG. 21. First, on each of two transparent substrates 60, 61, a transparent photopolymer layer is formed, and the transparent photopolymer layer is patterned by the photolithographic technique. Patterned transparent photopolymer layer 62 on the side of transparent substrate 60 is disposed with a constant pitch.

Similarly, patterned transparent photopolymer layer 63 on the side of transparent substrate 61 is also disposed with the same pitch as that of transparent photopolymer layer 62. The width and a thickness of each of transparent photopolymer layers 62, 63 are the same. The width of each of transparent photopolymer layers 62, 63 is smaller than the pitch width. While aligning transparent photopolymer layer 62 and transparent photopolymer layer 63 to be situated between gaps of the other transparent photopolymer layer, transparent photopolymer layer 62 and transparent substrate 61 are attached to each other, and transparent photopolymer layer 63 and transparent substrate 60 are attached to each other. In such manner, the substrate shown in FIG. 20D is provided. Subsequently, the curable material is injected and cured by the procedures in the other manufacturing method described above.

Figure 22:
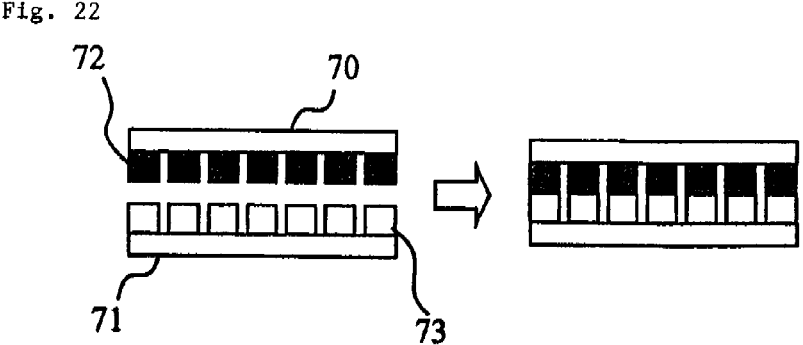
FIG. 22 is a view for describing still another manufacturing method of the microlouver of the present invention.

Further, there is also a method for manufacturing the microlouver using processes shown in FIG. 22. First, on each of two transparent substrates 70, 71, a transparent photopolymer layer is formed, and the transparent photopolymer layer is patterned by the photolithographic technique. Patterned transparent photopolymer layer 72 on the side of transparent substrate 70 is disposed with a constant pitch. Similarly, patterned transparent photopolymer layer 73 on the side of transparent substrate 71 is also disposed with the same pitch as that of transparent photopolymer layer 72. Each of transparent photopolymer layers 72, 73 has the same pattern and also the same width and height. Transparent photopolymer layer 72 and transparent photopolymer layer 73 are attached to each other. In such manner, the substrate shown in FIG. 20D is provided. Subsequently, the curable material is injected and cured by the procedures in the other manufacturing method described above.

In addition, the manufacturing method shown in FIGS. 19A to 19F can be applied to any one of the first to fourth exemplary embodiments. Each of the manufacturing methods shown in FIGS. 20A to 20E, FIG. 21 and FIG. 22 can be suitably applied to a structure in which light absorption layers are continuous between the periodic structures because of using the capillary phenomenon.

The microlouver of the present invention described above can be applied not only to a liquid crystal display, but also to another display device, for example, a luminescent display such as a plasma display or an electroluminescent display.

Further, as for a usage pattern for the microlouver of the present invention, various usage patterns such as an exemplary embodiment in which the microlouver is installed in an illuminating optical device, an exemplary embodiment in which the microlouver is directly attached onto the front face of a display panel to use, or an exemplary embodiment in which the microlouver is installed in a display device, may be considered. Now, a configuration in each usage pattern will be specifically described below.

(1) First, an illuminating optical device including the microlouver of the present invention will be described.

[First Illuminating Optical Device]

Figure 23:
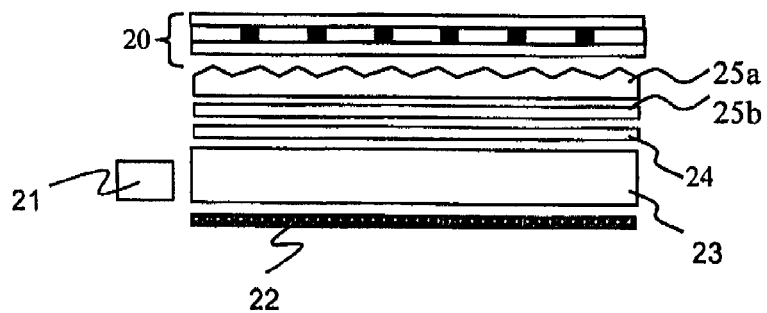
FIG. 23 is a schematic diagram illustrating a configuration of a first illuminating optical device on which the microlouver of the present invention is mounted.

FIG. 23 illustrates a configuration of a first illuminating optical device on which the microlouver of the present invention is mounted. Referring to FIG. 23, the first illuminating optical device includes a surface light source and microlouver 20. The surface light source includes light source 21 represented by a cold-cathode tube, reflecting sheet 22, optical waveguide 23, diffuser 24 and prism sheets 25a, 25b. Microlouver 20 may be any one of the microlouvers in the first to fourth exemplary embodiment.

Optical waveguide 23 is formed of acrylic resin and configured in a manner in which a light beam emitted from light source 21 is incident on one end surface thereof, and the incident light beam propagates through the optical waveguide to exit uniformly from the side of a front face (predetermined side surface). On the side of a back face of optical waveguide 23, reflecting sheet 22 is provided to reflect a light beam which exits from the back face to the front face direction. Reflecting means not shown are also provided on the other end surface and side surfaces of optical waveguide 23.

The light beam which exits from the front face of optical waveguide 23 enters microlouver 20 through diffuser 24 and prism sheets 25a, 25b. Diffuser 24 diffuses the light beam incoming from optical waveguide 23. The brightness of the outgoing beam on the right end portion is different from the brightness of the outgoing beam on the left end portion of optical waveguide 23 due to the structure thereof. Therefore, diffuser 24 diffuses the light beam from optical waveguide 23.

Figure 24:
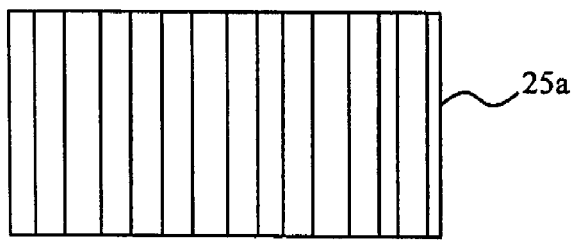
FIG. 24 is a plan view of a prism sheet constituting the illuminating optical device shown in FIG. 23.

Prism sheets 25a, 25b improve brightness of the light beam incoming from optical waveguide 23 through diffuser 24. Prism sheet 25a includes, as shown in FIG. 24, a plurality of prisms disposed with a constant period in a constant direction. Prism sheet 25b also has the same configuration as that shown in FIG. 24, but the regular arrangement direction of the prisms intersects with the regular arrangement direction of the prisms of prism sheet 25a. Owing to these prism sheets 25a, 25b, directivity of the light beam diffused by diffuser 24 can be enhanced.

In the first illuminating optical device, the light beam which exited from the front face of optical waveguide 23, after being diffused by diffuser 24, enters microlouver 20 through prism sheets 25a, 25b. The directivity of the light beam from diffuser 24 is enhanced by prism sheets 25a, 25b, and then the directivity is enhanced by the microlouver 20.

Figure 1:
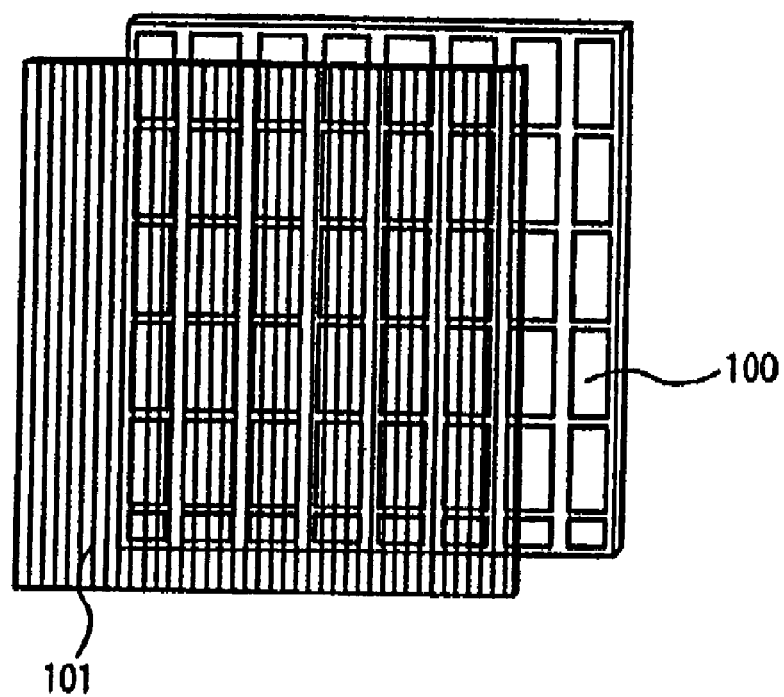
FIG. 1 is a schematic diagram illustrating one exemplary embodiment of a liquid crystal display capable of switching between a display form having a narrow field of view and a display form having a wide field of view.
Figure 2:
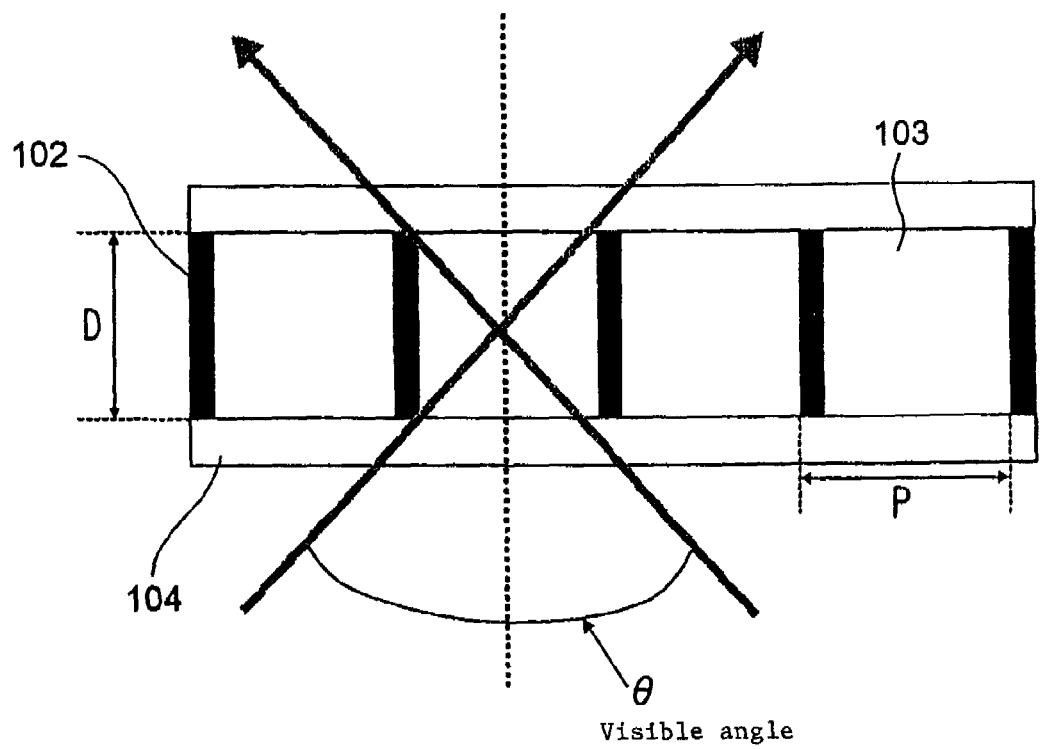
FIG. 2 is a schematic diagram illustrating a configuration of a microlouver shown in FIG. 1.
Figure 3:
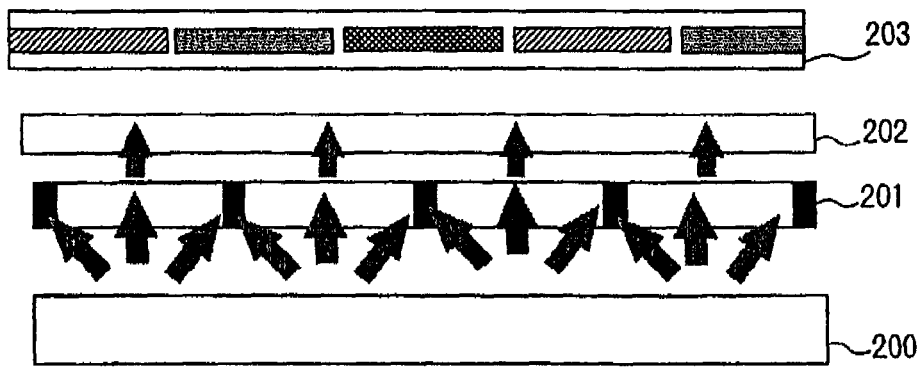
FIG. 3 is a schematic diagram illustrating a configuration of a liquid crystal display housing a microlouver.

In an illuminating optical device on whose upper portion the microlouver having periodicity shown in FIG. 1 is disposed, Moire fringes are produced between the microlouver and the prism sheets having periodicity. On the contrary, in the first illuminating optical device shown in FIG. 23, microlouver 20 of the present invention is mounted on the upper portion thereof. Microlouver 20 has no periodicity. Therefore, Moire fringes are not produced between microlouver 20 and the prism sheets having periodicity.

Figure 25:
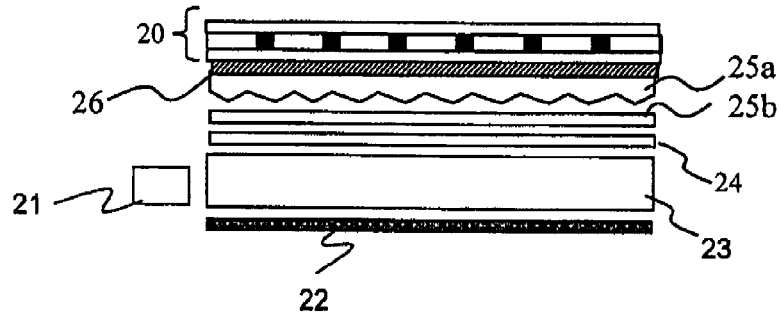
FIG. 25 is a schematic diagram illustrating a modified, exemplary embodiment of the first illuminating optical device shown in FIG. 23.

Further, in the first illuminating optical device, microlouver 20 may be attached to prism sheet 25a through transparent adhesive layer 26 shown in FIG. 25. Owing to such configuration, surface reflection loss on an interface between microlouver 20 and prism sheet 25a can be reduced, thereby providing illumination light having a higher brightness.

In addition, this exemplary embodiment has been described using the cold-cathode tube for the light source as an example, but the light source is not limited to this. White LED or 3-color LED may be used as the light source. Further, this exemplary embodiment has been described using the light source of the type that provides light from the side, as an example, but the light source is not limited to this type, and the light source of the type that provides light from the upper surface or the lower surface may be used. That is, the present invention may be applied to an illuminating optical device having any combination of optical elements, as long as the illuminating optical device includes an optical element having periodicity (in this exemplary embodiment, the prism sheet).

[Second Illuminating Optical Device]

Figure 26:
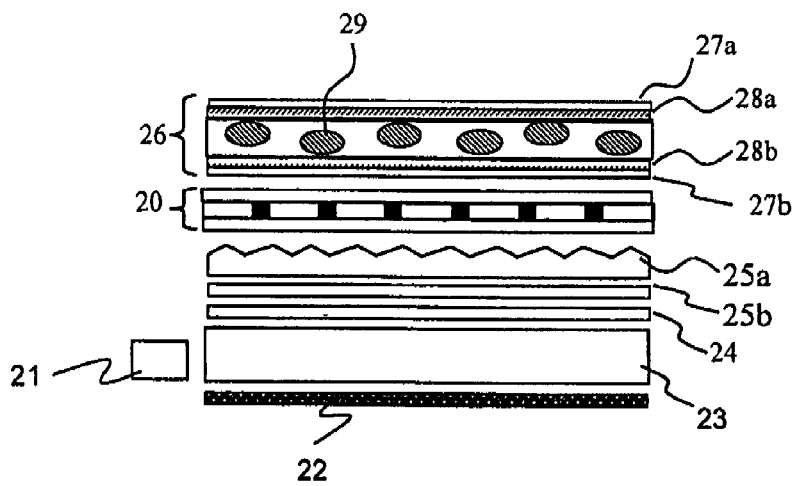
FIG. 26 is a schematic diagram illustrating a configuration of a second illuminating optical device on which the microlouver of the present invention is mounted.

FIG. 26 illustrates a configuration of a second illuminating optical device on which the microlouver of the present invention is mounted. The second illuminating optical device, in the configuration shown in FIG. 23, is similar to the first illuminating optical device, except that transmission scattering switching device 26 is disposed on microlouver 20. In FIG. 26, a component similar to that of the first illuminating optical device is denoted by the same symbol. To avoid repetitive description, description of the similar components will be omitted.

Transmission scattering switching device 26 is, for example, PNLC (Polymer Network LC). Transmission scattering switching device 26 includes substrate 27a having transparent electrode 28a provided thereon, substrate 27b having transparent electrode 28b provided thereon and polymer dispersed liquid crystal 29 sandwiched between these substrates 27a, 27b.

Under a condition that a voltage is applied between transparent electrodes 28a, 28b, a polymer chain and polymer dispersed liquid crystal 29 coincide with each other in the refractive index, and transmission scattering switching device 26 becomes transparent. Under this transparent state, a light beam from microlouver 20, as is, passes through transmission scattering switching device 26. On the one hand, under a condition that a voltage is not applied between transparent electrodes 28a, 28b, the polymer chain and polymer dispersed liquid crystal 29 do not coincide with each other in the refractive index, and a light beam from microlouver 20 is scattered when it passes through transmission scattering switching device 26. In such manner, transmission scattering switching device 26 is brought into the transparent state upon application of a voltage and into the scattered state when a voltage is not applied. Transmission scattering switching device 26 may be a component capable of switching between the transparent state and the scattered state due to an applied voltage such as PDLC (Polymer Dispersed Liquid Crystal) except PNLC.

In the second illuminating optical device shown in FIG. 26, when transmission scattering switching device 26 is brought into the transparent state, similar to the case of using the first illuminating optical device, periodicity in entire microlouver 20 is eliminated due to the effect of averaging light, and thereby production of Moire fringes can be controlled.

In the transparent state, the range of an exit angle is narrowed by microlouver 20. On the other hand, in the scattered state, the range of the exit angle is widened by microlouver 20. An illuminating optical device can be provided which is able to adjust the exit angle by switching the transmission scattering switching device in a way described above.

In the second illuminating optical device, transmission scattering switching device 26 may be attached to microlouver 20 through a transparent adhesive layer. Owing to such configuration, surface reflection loss on an interface between microlouver 20 and transmission scattering switching device 26 can be reduced, providing illumination light having higher brightness.

The exemplary embodiment of the illuminating optical device described above uses two prism sheets, but may use one prism sheet.

(2) Next, a usage pattern in which the microlouver of the present invention is directly attached to a front face of a display panel will be described.

FIG. 27 illustrates a configuration of a display device on which a display screen the microlouver of the present invention is provided. Referring to FIG. 27, the display device includes an optical control device, an illuminating optical device and microlouver 20.

Microlouver 20 is any one of the microlouvers of the first to fourth exemplary embodiment and restricts the range of the exit direction of a light beam from the optical control device (internal light). The illuminating optical device includes light source 21, reflecting sheet 22, optical waveguide 23, diffuser 24 and prism sheets 25a, 25b shown in FIG. 23, and it illuminates the optical control device with a light beam which passes through prism sheets 25a, 25b.

The optical control device has a structure in which liquid crystal layer 32 is sandwiched between two substrates 30a, 30b. Substrate 30a has color filter 33 formed on one surface thereof (the surface on the side of liquid crystal layer 32) and polarizing plate/phase difference plate 31a provided on the other surface. On a surface of substrate 30b opposite to a surface on the side of liquid crystal layer 32, polarizing plate/phase difference plate 31b is provided. Color filter 33 is configured in such a manner that color filters of R (red), G (green) and B (black) are arranged in a matrix on regions divided by a black matrix formed of a light absorbing layer. Each of the color filters corresponds to a pixel, and its pitch is constant. Liquid crystal layer 32 is adapted to be able to switch between a transparent state and a light shielding state, one pixel-by-one pixel, following a control signal from a control device not shown, and by switching of these states, an incident light beam is modulated spatially.

In the display device shown in FIG. 27, a light beam which passes through prism sheets 25a, 25b enters polarizing plate/phase difference plate 31b. A light beam which passes through polarizing plate/phase difference plate 31b enters liquid crystal layer 32 through substrate 30b, and there, spatial modulation is implemented pixel by pixel. A light beam which passes through liquid crystal layer 32 (modulated light) passes through color filter 33 and substrate 30a in turn, and enters polarizing plate/phase difference plate 31a. A light beam which passes through polarizing plate/phase difference plate 31a exits through microlouver 20.

In addition, in the configuration shown in FIG. 27, polarizing plate/phase difference plates 31a, 31b are used for the optical control device, but the optical control device is not limited to this. The optical control device may be formed of only a polarizing plate.

According to the display device described above, the light beam from polarizing plate/phase difference plate 31a (modulated light) is restricted in an exit direction by microlouver 20, and thereby a visible region can be narrowed. Therefore, it is possible to prevent other people from peeping at displayed information.

In addition, due to the effect of averaging light, periodicity in entire microlouver 20 is eliminated, and thereby production of Moire fringes can be controlled. Here, for protection of the surface of microlouver 20 against scratches, a hard coat layer or an antireflection layer that is used to prevent outside light from being reflected may be formed on a surface of microlouver 20.

Microlouver 20 may be configured removably. In this case, by attaching microlouver 20 to the optical control device, a display form having a narrow field of view can be realized, and by removing microlouver 20 from the optical control device, a display form having a wide field of view can be realized.

(3) Next, a display device having the microlouver of the present invention mounted therein will be described.

[First Display Device]

FIG. 28 illustrates a configuration of a first display device inside of which the microlouver of the present invention is mounted. The first display device includes an optical control device, an illuminating optical device for illuminating this optical control device and microlouver 20 provided between the optical control device and the illuminating optical device.

Microlouver 20 is any one of the microlouvers of the first to fourth exemplary embodiments and restricts the range of an exit direction of a light beam from the illuminating optical device. The illuminating optical device includes light source 21, reflecting sheet 22, optical waveguide 23, diffuser 24 and prism sheets 25a, 25b shown in FIG. 23. A light beam which passes through prism sheets 25a, 25b illuminates the optical control device through microlouver 20. The optical control device is the same as the optical control device shown in FIG. 27.

According to the first display device, the light beam for illuminating the optical control device is restricted in an exit direction by microlouver 20, and thereby a visible region can be narrowed. Therefore, it is possible to prevent other people from peeping at displayed information.

In addition, due to the effect of averaging light, periodicity in entire microlouver 20 is eliminated, and thereby production of Moire fringes can be controlled.

In the configuration shown in FIG. 28, microlouver 20 may be attached onto the optical control device through a transparent adhesive layer. Owing to such configuration, surface reflection loss on an interface between microlouver 20 and the optical control device can be reduced, providing illumination light having higher brightness.

[Second Display Device]

FIG. 29 illustrates a configuration of a second display device inside of which the microlouver of the present invention is mounted. The second display device includes an optical control device, an illuminating optical device for illuminating this optical control device, and microlouver 20 and transmission scattering switching device 26 provided between the optical control device and the illuminating optical device.

Microlouver 20 is any one of the microlouvers of the first to fourth exemplary embodiments and restricts the range of the exit direction of a light beam from the illuminating optical device. The illuminating optical device includes light source 21, reflecting sheet 22, optical waveguide 23, diffuser 24 and prism sheets 25a, 25b shown in FIG. 23. A light beam which passes through prism sheets 25a, 25b illuminates the optical control device through microlouver 20. The optical control device is the same as the optical control device shown in FIG. 27. Transmission scattering switching device 26 is the same as that in FIG. 26.

If, in the second display device, an existing microlouver having periodicity is disposed, when transmission scattering switching device 26 is brought into the transparent state, due to interference between the optical control device and the microlouver, Moire fringes are produced. Microlouver 20 of the present invention has no periodicity. Therefore, in the second display device in which microlouver 20 is installed, Moire fringes can be controlled.

In the transparent state, the range of an exit angle of a display panel is narrowed by microlouver 20. In this case, because a visible region in a display screen of the optical control device is narrowed, it is possible to prevent peeping. On the other hand, in the scattered state, the range of the exit angle of the display screen of the optical control device is widened by microlouver 20. In this case, because of the wide visible region, a plurality of persons can see the display screen concurrently.

The configuration shown in FIG. 29 may be configured in a manner in which microlouver 20 and substrate 27b of transmission scattering switching device 26 are attached to each other through a transparent adhesive layer, and/or optical control device and substrate 27a of transmission scattering switching device 26 are attached to each other through a transparent adhesive layer. Owing to such configuration, surface reflection loss on an interface between microlouver 20 and substrate 27b or between the optical control device and substrate 27a can be reduced, providing illumination light having higher brightness.

[Third Display Device]

Figure 30:
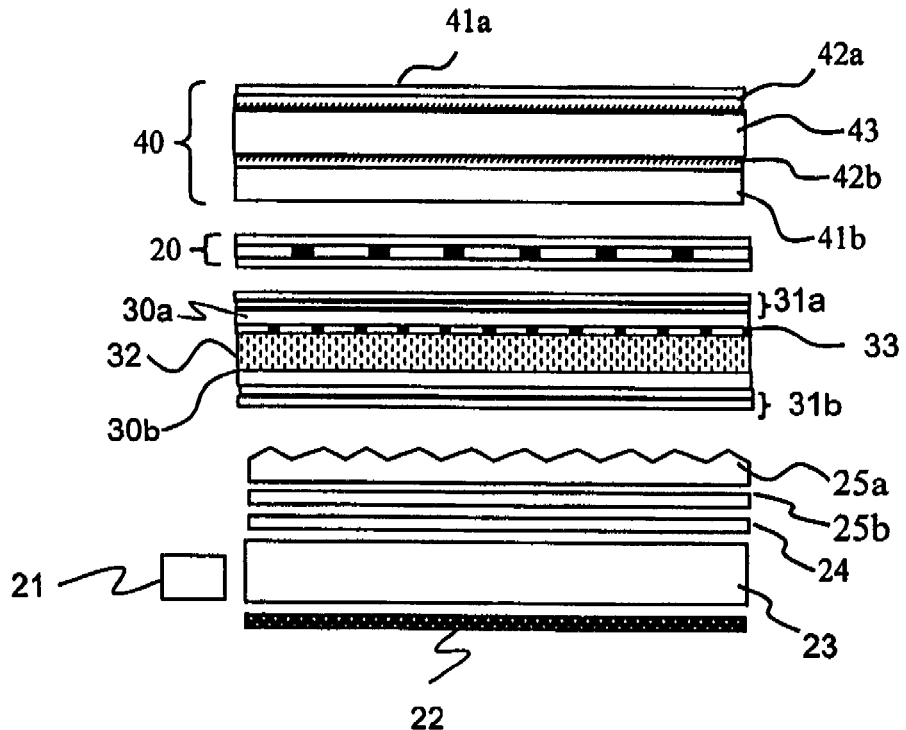
FIG. 30 is a schematic diagram illustrating a configuration of a third display device inside of which the microlouver of the present invention is mounted.

FIG. 30 illustrates a configuration of a third display device inside of which the microlouver of the present invention is mounted. The third display device is configured in a manner in which an illuminating optical device, an optical control device, microlouver 20 and input device 40 are stacked one on top of another in this order.

Microlouver 20 is any one of the microlouvers of the first to fourth exemplary embodiments and restricts the range of the exit direction of a light beam (internal light) from the optical control device. The illuminating optical device includes light source 21, reflecting sheet 22, optical waveguide 23, diffuser 24 and prism sheets 25a, 25b shown in FIG. 23. A light beam which passes through prism sheets 25a, 25b illuminates the optical control device.

The optical control device is the same as the optical control device shown in FIG. 27.

Input device 40 is a so-called "touch panel" in which transparent electrode 42a formed on transparent substrate 41a and transparent electrode 42b formed on transparent substrate 41b are provided opposite to each other through spacer 43. A touch panel system is not limited to a resistance film system shown in FIG. 30, but an existing system such as an electro-static capacitance coupling system may be used.

According to the third display device, the exit direction of a light beam from the optical control device is restricted by microlouver 20, and thereby a visible region can be narrowed. Therefore, it is possible to prevent other people from peeping at displayed information.

In addition, due to the effect of averaging light, periodicity in entire microlouver 20 is eliminated, and thereby production of Moire fringes can be controlled.

The configuration shown in FIG. 30 may be configured in a manner in which microlouver 20 and transparent substrate 41b of input device 40 are attached to each other through a transparent adhesive layer, and/or the microlouver 20 and the optical control device are attached to each other through a transparent adhesive layer. Owing to such configuration, surface reflection loss on an interface between microlouver 20 and transparent substrate 41b or between microlouver 20 and the optical control device can be reduced, providing a display screen having higher brightness.

Further, microlouver 20 may be disposed on input device 40. In this case, microlouver 20 may be attached to transparent substrate 41a of input device 40 through a transparent adhesive layer. Owing to such configuration, surface reflection loss on an interface between microlouver 20 and transparent substrate 41a can be reduced, thereby providing a display screen having higher brightness.

Further, microlouver 20 may be provided between the optical control device and the illuminating optical device. In this case, microlouver 20 may be attached to prism sheet 25a or the optical control device through a transparent adhesive layer. Owing to such configuration, surface reflection loss on an interface between microlouver 20 and prism sheet 25a, or between microlouver 20 and the optical control device can be reduced, thereby providing illumination light having higher brightness.

[Fourth Display Device]

Figure 31:
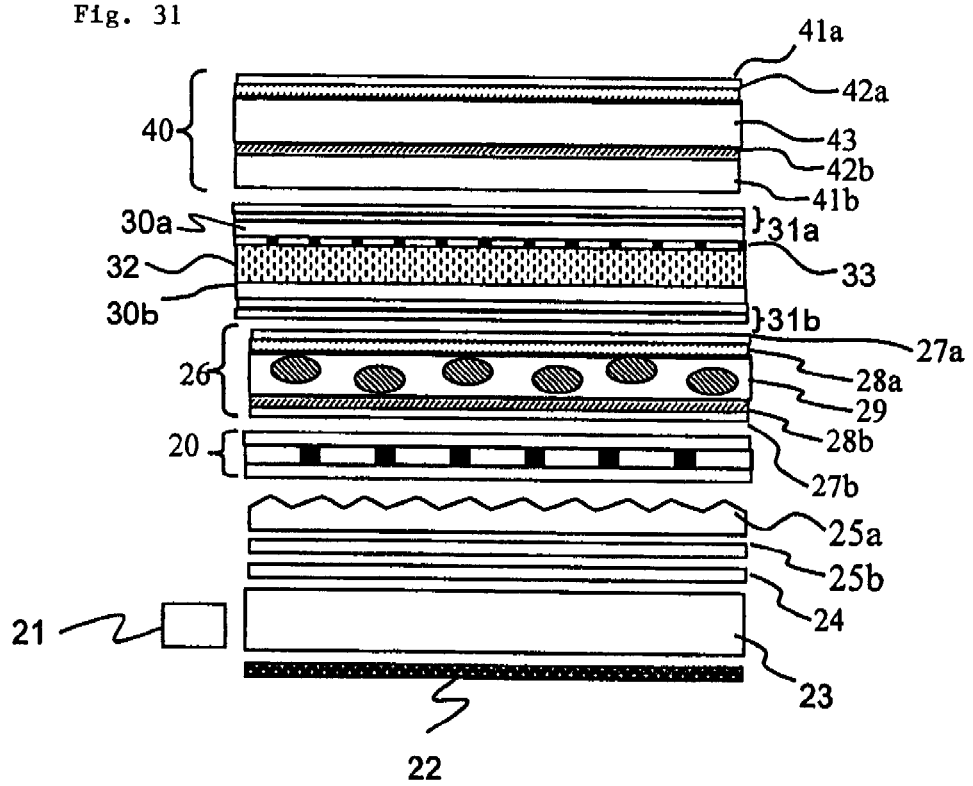
FIG. 31 is a schematic diagram illustrating a configuration of a fourth display device inside of which the microlouver of the present invention is mounted.

FIG. 31 illustrates a configuration of a fourth display device inside of which the microlouver of the present invention is mounted. The fourth display device is configured in a manner in which an illuminating optical device, microlouver 20, transmission scattering switching device 26, an optical control device, and input device 40 are stacked one on top of another in this order.

Microlouver 20 is any one of the microlouvers of the first to fourth exemplary embodiments and restricts the range of the exit direction of a light beam from the illuminating optical device. The illuminating optical device includes light source 21, reflecting sheet 22, optical waveguide 23, diffuser 24 and prism sheets 25a, 25b shown in FIG. 23. A light beam which passes through prism sheets 25a, 25b illuminates the optical control device through microlouver 20 and transmission scattering switching device 26. Transmission scattering switching device 26 is the same as that shown in FIG. 26. The optical control device is the same as that shown in FIG. 27. Input device 40 is the same as that shown in FIG. 30.

According to the fourth display device, when transmission scattering switching device 26 is brought into the transparent state, due to the effect of averaging light, periodicity in entire microlouver 20 is eliminated, and thereby production of Moire fringes can be controlled.

In the transparent state, the range of an exit angle at a display panel is narrowed by microlouver 20. In this case, because a visible region on a display screen of the optical control device is narrowed, it is possible to prevent peeping. On the other hand, in the scattered state, the range of the exit angle at the display screen of the optical control device is widened by microlouver 20. In this case, because the visible region is widened, a plurality of persons can see the display screen concurrently.

In the configuration shown in FIG. 31, a control device which receives an input through input device 40 and controls transmission scattering switching device 26, and a storage device which stores information such as a commercial message in advance may be provided. When information is not supplied through input device 40, the control device controls modulation in the optical control device in order to cause transmission scattering switching device 26 in the scattered state to display information stored in the storage device. When information is supplied through input device 40, the control device controls modulation in the optical control device in order to cause transmission scattering switching device 26 in the transparent state to display the input information. Owing to such configuration, for example, in an ATM terminal, advertising information is displayed in a wide field mode on a screen before information is input, and when personal information is input, the input information (personal information) can be displayed in a narrow field mode.

Further, microlouver 20 and transmission scattering switching device 26 may be attached to each other through a transparent adhesive layer, and transmission scattering switching device 26 and the optical control device may be attached to each other through a transparent adhesive layer. Owing to such configuration, surface reflection loss on an interface between microlouver 20 and transmission scattering switching device 26, or between transmission scattering switching device 26 and the optical control device can be reduced, thereby providing illumination light having higher brightness.

The microlouver of the present invention can be readily applied to the display device of an information processing terminal such as ATM terminals, mobile phones, notebook PCs and PDA.

An example of a display device that may be applied to the display device of ATM terminals may be, for example, the display device of the third and fourth exemplary embodiments.

When the third and fourth display device are applied to the display device of ATM terminals, it is possible to prevent displayed personal information from being peeped at, and further high-quality display images can be provided because of controlled Moire fringes. In this case, by adopting the configuration shown in FIG. 17 (two-dimensional louver structure) as the microlouver, the visible region is narrowed not only in the horizontal direction, but also in the vertical direction, thereby a screen more difficult to peep at can be provided.

Further, in the fourth display device, when information is input, a display form in a narrow field mode prevents peeping, and at other times, the display form is switched to a wide field mode to display advertising messages, and thereby advertisement using the ATM terminals can be more effectively performed.

As an example of a display device that may be to mobile information processing terminals for such as mobile phones, notebook PCs, or PDA, for example, the display device of the first and second exemplary embodiments may be considered.

In the information processing terminal, a control device receives input from an input device such as a mouse or a keyboard, and controls to displaying the required information on a display device. In this case, it is possible to prevent displayed information from being seen by unwanted third parties and Moire fringes can be controlled, thereby high-quality display images can be provided.

Further, in this information processing terminal, an input device (touch panel) as described in the third or fourth display device can also be provided.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

What is claimed is:

1. An optical element, comprising a periodic structure in which a transparent layer and a light absorption layer are alternately disposed on a plane with a constant, repetitive period, said light absorption layer restricting a range of an exit direction of a light beam passing through said transparent layer, wherein
said periodic structure includes a plurality of periodic structure portions divided in a direction which intersects a direction in which said transparent layer and said light absorption layer are repeatedly disposed, and at least a part of said plurality of periodic structure portions has a phase of spatial frequency that is different from a phase of spatial frequency of another part of said plurality of periodic structure portions.

2. The optical element according to claim 1, wherein
said plurality of periodic structure portions comprise a first periodic structure portion and a second periodic structure portion having a phase of spatial frequency different from that of said first periodic structure portion by 180°.

3. The optical element according to claim 2, wherein
said first periodic structure portion and said second periodic structure portion are disposed alternately.

4. The optical element according to claim 1, wherein
said plurality of periodic structure portions are arranged according to a predetermined progression generation rule.

5. The optical element according to claim 1, wherein
said plurality of periodic structure portions are arranged randomly.

6. The optical element according to claim 1, wherein
said light absorption layer is provided in a boundary portion for respectively dividing said plurality of periodic structure portions.

7. A display device, comprising:
an optical element according to claim 1;
a display panel on which a pixel is disposed; and
a surface light source for illuminating said display panel, wherein
a light beam from said surface light source illuminates said display panel through said optical element.

8. The display device according to claim 7, further comprising:
an input device provided on a side of a display screen of said display panel, wherein
positional information of said display panel, based on a change of local pressure or a change of local current, is supplied to said input device.

9. An electronic device, comprising:
a display device according to claim 7.

10. A display device, comprising:
an optical element according to claim 1;
a display panel on which a pixel is disposed;
a surface light source for illuminating said display panel; and
a transmission scattering switching device on which a light beam from said surface light source is incident through said optical element, said transmission scattering switching device being able to switch between a transparent state in which an incident light beam exits in its current condition and a scattered state in which an incident light beam exits as a diffused light beam due to scattering, wherein a light beam exiting from said transmission scattering switching device illuminates said display panel.

11. The display device according to claim 10, further comprising:

an input device provided on a side of a display screen of said display panel, wherein positional information of said display panel, based on a change of local pressure or a change of local current, is supplied to said input device.

12. An electronic device, comprising:
a display device according to claim 10.

13. An electronic device, comprising:
a display device according to claim 10, wherein
said transmission scattering switching device switches between the transparent state and the scattered state based on a signal supplied from the outside.

14. A display device, comprising:
an optical element according to claim 1; and
a display device on which a pixel is disposed, wherein
a light beam from said display device exits through said optical element.

15. The display device according to claim 14, wherein
said optical element is removably provided on a display screen of said display panel.

16. The display device according to claim 14, further comprising:

an input device provided on said optical element, wherein
positional information of said display panel, based on a change of local pressure or a change of local current, is supplied to said input device.

17. An electronic device, comprising:
a display device according to claim 14.

18. The optical element according to claim 1, wherein said periodic structure includes periodic structures arranged both in said direction in which said transparent layer and said light absorption layer are repeatedly disposed, and in said direction which intersects said direction in which said transparent layer and said light absorption layer are repeatedly disposed.

19. The optical element according to claim 1, wherein said light absorption layer restricts a range of an exit direction of an incoherent light beam passing through said transparent layer.

20. The optical element according to claim 1, wherein said periodic structure is configured to substantially reduce production of Moire fringes caused by a phase difference in spatial frequency between said optical element and a second optical element having a periodic structure.

21. The optical element according to claim 1, wherein said periodic structure is configured such that light beams which pass through said part of said plurality of periodic structure portions and said another part of said plurality of periodic structure portions, respectively, are averaged to effectively eliminate periodicity of said optical element.

22. An illuminating optical device comprising:
an optical element which comprises a periodic structure in which a transparent layer and a light absorption layer are alternately disposed on a plane with a constant, repetitive period, said light absorption layer restricting a range of an exit direction of a light beam passing through the transparent layer, and a surface light source provided on a back surface of said optical element, wherein said periodic structure includes a plurality of periodic structure portions divided in a direction which intersects a direction in which said transparent layer and said light absorption layer are repeatedly disposed, and at least a part of said plurality of periodic structure portions has a phase of spatial frequency that is different from a phase of spatial frequency of another part of said plurality of periodic structure portions.

23. The illuminating optical device according to claim 22, wherein said surface light source comprises: at least
a light source;
a diffuser for diffusing a light beam from the light source; and
a prism array which comprises a plurality of prisms regularly disposed and which changes a diffused light beam from said diffuser into light flux going to said optical element.

24. The illuminating optical device according to claim 22, further comprising:

a transmission scattering switching device on which a light beam from said optical element is incident, wherein
said transmission scattering switching device is able to switch between a transparent state in which an incident light beam exits in its current condition and a scattered state in which an incident light beam exits as a diffused light beam due to scattering.

25. An optical element, comprising a periodic structure in which a transparent layer and a light absorption layer are alternately disposed on a plane with a constant, repetitive period, said light absorption layer restricting a range of an angle of a light beam passing through said transparent layer, wherein said periodic structure includes a plurality of periodic structure portions divided in a direction which intersects a direction in which said transparent layer and said light absorption layer are repeatedly disposed, and at least a part of said plurality of periodic structure portions has a phase of spatial frequency that is different from a phase of spatial frequency of another part of said plurality of periodic structure portions.

* * * * *